(12) United States Patent
Bae

(10) Patent No.: US 8,142,039 B2
(45) Date of Patent: Mar. 27, 2012

(54) BACKLIGHT ASSEMBLY AND METHOD OF ASSEMBLING THE SAME

(75) Inventor: Hyun-Chul Bae, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 409 days.

(21) Appl. No.: 12/468,429

(22) Filed: May 19, 2009

(65) Prior Publication Data

US 2010/0073908 A1   Mar. 25, 2010

(30) Foreign Application Priority Data

Sep. 19, 2008   (KR) .................. 10-2008-0092248

(51) Int. Cl.
*G09F 13/04* (2006.01)

(52) U.S. Cl. ....... 362/97.1; 362/221; 362/225; 362/260; 362/631; 362/634

(58) Field of Classification Search .................. 349/70; 362/221, 225, 260, 97.1, 97.2, 631, 634; 439/160, 226, 620.02, 834
See application file for complete search history.

(56) References Cited

U.S. PATENT DOCUMENTS

| 7,883,231 B2 * | 2/2011 | Cho et al. ................ 362/97.1 |
| 7,926,965 B2 * | 4/2011 | Cho et al. ................ 362/97.1 |

* cited by examiner

*Primary Examiner* — Stephen F Husar
(74) *Attorney, Agent, or Firm* — Cantor Colburn LLP

(57) ABSTRACT

A backlight assembly with reduced thickness, a reduced number of parts and a reduced probability of causing environmental contamination includes lamps, each lamp including a lamp tube and a pair of lamp electrodes disposed at ends of the lamp tube, respectively, a lamp-driving printed circuit board ("PCB") which includes a plurality of conductive pads and a plurality of pairs of first socket-fixing grooves and provides a driving voltage to each of the lamps, sockets, each socket including a conductive body which includes a first guide groove, into which each of the lamp electrodes is inserted, and a pair of first fixing protrusions which is inserted into each pair of the first socket-fixing grooves, and a lower case which accommodates the lamp-driving PCB, the sockets, and the lamps, wherein each of the sockets is surface-mounted on a corresponding conductive pad.

9 Claims, 27 Drawing Sheets

BACKLIGHT ASSEMBLY AND METHOD OF ASSEMBLING THE SAME

This application claims priority to Korean Patent Application No. 10-2008-0092248, filed on Sep. 19, 2008, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a method of assembling the same, and more particularly, to a backlight assembly with reduced thickness, a reduced number of parts and a reduced probability of causing environmental contamination, and a method of assembling the backlight assembly.

2. Description of the Related Art

Liquid crystal displays ("LCDs") are one of the most widely used flat panel displays ("FPDs"). An LCD includes two display panels, on which electrodes are formed, and a liquid crystal layer which is interposed between the two display panels. The LCD rearranges liquid molecules of the liquid crystal layer by applying voltages to the electrodes and thus controls the amount of light that passes through the liquid crystal layer. In this way, the LCD displays a desired image.

Being passive light-emitting devices, LCDs include a backlight assembly which provides light that passes through the liquid crystal layer.

A conventional backlight assembly includes, inside a lower case, a plurality of sockets which fix lamps to the lower case, a socket guide which fixes the sockets to the lower case, a housing, and the like. The housing, for example, is made of a plastic material. The conventional backlight assembly further includes, on a rear surface of the lower case, an inverter which drives the lamps, an insulating plate which insulates the inverter, an inverter cover which covers the insulating plate, and the like.

BRIEF SUMMARY OF THE INVENTION

It has been determined herein, according to the present invention, that the housing of a conventional backlight assembly made of a plastic material may cause environmental problems such as halogen contamination. In addition, since the inverter which drives the lamps, the insulating plate, and the like are installed on the rear surface of the lower case, the thickness of the conventional backlight assembly and the number of parts required can be increased.

Exemplary embodiments of the present invention provide a backlight assembly with reduced thickness, a reduced number of parts, and a reduced probability of causing environmental contamination.

Exemplary embodiments of the present invention also provide a method of assembling a backlight assembly with reduced thickness, a reduced number of parts, and a reduced probability of causing environmental contamination.

According to an exemplary embodiment of the present invention, there is provided a backlight assembly including lamps, each lamp including a lamp tube and a pair of lamp electrodes disposed at ends of the lamp tube, respectively, a lamp-driving printed circuit board ("PCB") which includes a plurality of conductive pads and a plurality of pairs of first socket-fixing grooves and provides a driving voltage to each of the lamps, sockets, each socket including a conductive body which includes a first guide groove, into which each of the lamp electrodes is inserted, and a pair of first fixing protrusions which is inserted into each pair of the first socket-fixing grooves, and a lower case which accommodates the lamp-driving PCB, the sockets, and the lamps, wherein each of the sockets is surface-mounted on a corresponding conductive pad.

According to other exemplary embodiments of the present invention, there is provided a backlight assembly including lamps, each lamp including a lamp tube and a pair of lamp electrodes disposed at both ends of the lamp tube, respectively, a lamp-driving PCB which includes a plurality of socket insertion grooves indented from a side thereof, a plurality of conductive pads, and provides a driving voltage to each of the lamps, sockets, each socket including a conductive body which has a first guide groove, into which each of the lamp electrodes is inserted, a vertical fixing portion which grips the lamp-driving PCB in a vertical direction, and a horizontal fixing portion which is coupled to each of the socket insertion grooves in a horizontal direction, and a lower case which accommodates the lamp-driving PCB, the sockets, and the lamps.

According to other exemplary embodiments of the present invention, there is provided a backlight assembly including lamps, each lamp including a lamp tube and a pair of lamp electrodes disposed at opposing ends of the lamp tube, respectively, a lamp-driving PCB including a main body, on which circuit devices providing a driving voltage to each of the lamps are disposed, and a plurality of socket contact portions which protrude from the main body, sockets, each socket including a conductive body having a first leaf spring and a second leaf spring which grip each of the lamp electrodes from opposing sides and a vertical fixing portion which grips each of the socket contact portions in a vertical direction, and a lower case which accommodates the lamp-driving PCB, the sockets, and the lamps.

According to other exemplary embodiments of the present invention, there is provided a method of assembling a backlight assembly. The method includes providing a lamp-driving PCB which includes a plurality of conductive pads and a plurality of pairs of first socket-fixing grooves, fixing a plurality of sockets, each socket including a conductive body having a first guide groove and a pair of first fixing protrusions, to the lamp-driving PCB such that the pair of the first fixing protrusions is inserted into each pair of the first socket-fixing grooves, respectively, and installing the lamp-driving PCB and the sockets in a lower case, wherein fixing the plurality of sockets to the lamp-driving PCB includes surface-mounting the conductive body of each socket on a corresponding conductive pad.

According to other exemplary embodiments of the present invention, there is provided a method of assembling a backlight assembly. The method includes providing a lamp-driving PCB which includes a plurality of socket insertion grooves indented from a side thereof and a plurality of conductive pads, fixing a plurality of sockets, each socket including a conductive body having a first guide groove, a vertical fixing portion and a horizontal fixing portion, to the lamp-driving PCB such that the vertical fixing portion grips the lamp-driving PCB in a vertical direction and the horizontal fixing portion is coupled to each of the socket insertion grooves in a horizontal direction, and installing the lamp-driving PCB and the sockets in a lower case.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
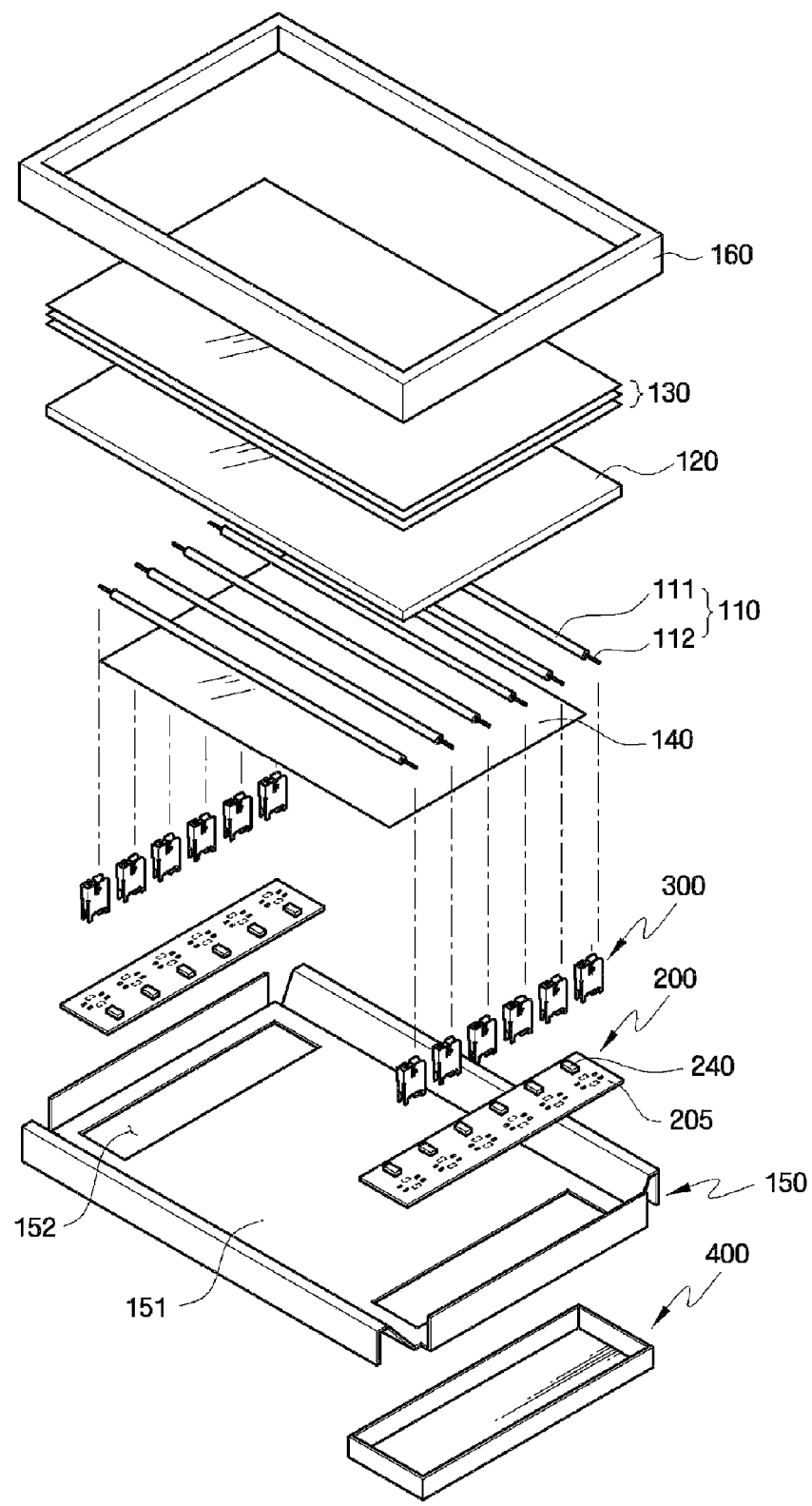
FIG. 1 is an exploded perspective view of an exemplary backlight assembly according to a first exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processing processes, well-known structures and well-known technologies will not be specifically described in order to avoid ambiguous interpretation of the present invention. Like reference numerals refer to like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below," "beneath," "lower," "above," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or components would then be oriented "above" the other elements or components. Thus, the exemplary term "below" or "beneath" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention are described herein with reference to illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, an exemplary backlight assembly according to a first exemplary embodiment of the present invention will be described in detail with reference to FIG. 1. FIG. 1 is an exploded perspective view of the exemplary backlight assembly according to the first exemplary embodiment of the present invention.

Referring to FIG. 1, the backlight assembly according to the first exemplary embodiment includes lamps 110, a diffusion plate 120, optical sheets 130, a reflective sheet 140, a lower case 150, an intermediate case 160, a pair of lamp-driving printed circuit boards ("PCBs") 200, sockets 300, and a lower cover 400.

The lamps 110 may be cold cathode fluorescent lamps ("CCFLs"), external electrode fluorescent lamps ("EEFLs"), or the like. The lamps 110 generate light when a lamp-driving voltage is applied thereto. The lamps 110 are arranged at regular intervals and connected in parallel to each other on an equiphase plane. The backlight assembly according to the present embodiment may be a direct-type backlight assembly in which the lamps 110 are disposed directly under a liquid crystal panel, as opposed to having a lamp or lamps disposed on a side of a light guide plate.

Each of the lamps 110 includes a lamp tube 111 and a pair of lamp electrodes 112. The lamp tube 111 seals a discharge gas therein, and the lamp electrodes 112 protrude from both ends of the lamp tube 111 and receive power from an external source. In order to achieve uniform luminance by uniformly distributing the discharge gases of the lamps 110, the lamps 110 may be arranged parallel to long sides of the lower case 150. The lamp electrodes 112 are inserted and thus fixed to the sockets 300 and receive power from an external source through the sockets 300, respectively.

The diffusion plate 120 is disposed on the lamps 110 and improves the luminance and luminance uniformity of light received from the lamps 110.

The optical sheets 130 are disposed on the diffusion plate 120 and diffuse and concentrate light received from the lamps 110. The optical sheets 130 may include a diffusion plate, a first prism sheet, and a second prism sheet.

The first prism sheet is disposed on the diffusion sheet, and prism patterns (not shown), which are shaped like triangular prisms, are arranged at regular intervals on a surface of the first prism sheet. The prism patterns concentrate light, which is diffused by the diffusion sheet, and output the concentrated light. The second prism sheet is disposed on the first prism sheet. The second prism sheet is a multi-layered, reflective polarizing prism sheet which concentrates and polarizes light and outputs the concentrated and polarized light. When sufficient luminance and viewing angle can be secured by using only the first prism sheet, the second prism sheet may be omitted.

The reflective sheet 140 is disposed under the lamps 110 and reflects light, which is emitted downward from the lamps 110 towards the reflective sheet 140, upward in a direction towards the diffusion plate 120. The reflective sheet 140 is made of a highly reflective material in order to minimize the loss of light that is emitted from the lamps 110. The reflective sheet 140 may have inclined surfaces at edges thereof in order to reduce the amount of light that is lost through sides of the lower case 150.

In an exemplary embodiment, the lower case 150 includes a bottom plate 151 and a plurality of sidewalls which surround the bottom plate 151. Apertures 152 are formed at both sides of the bottom plate 151 to be parallel to the short sides of the lower case 150, respectively. The lamp-driving PCBs 200, which will be described later, are inserted into the apertures 152, respectively.

A pair of sidewalls, which are formed along the long sides of the lower case 150, respectively, may have inclined surfaces in order to prevent light, which is emitted from the lamps 110, from being lost through the sides of the lower case 150. The inclined surfaces may be coated with a reflective material in order to enhance reflection efficieny. In an alternative exemplary embodiment, inclined surfaces of the reflective sheet 140 may cover inclined surfaces of the long sides of the lower case 150.

The pair of the sidewalls formed along the long sides of the lower case 150, respectively, may have bending portions on which the intermediate case 160 may rest or which may be coupled to a top chassis (not shown). Another pair of sidewalls, which are formed along the short sides of the lower case 150, respectively, may be disposed perpendicular to the lower case 150 and may not include bending portions.

The intermediate case 160 has a support platform which supports the liquid crystal panel (not shown). The intermediate case 160 is coupled to the lower case 150. As the intermediate case 160 is coupled to the lower case 150, it presses the optical sheets 130 and the diffusion plate 120 against the lower case 150 and thus fixes them to the lower case 150.

The intermediate case 160 may be a mold frame made of, e.g., a plastic material to prevent parts, which are fixed by the intermediate case 160 to the lower case 150, from being broken.

The lower cover 400 is disposed under the lower case 150 to cover the apertures 152 of the lower case 150 and thus cover the lamp-driving PCBs 200 which are disposed on or under the lower case 150.

Figure 2:
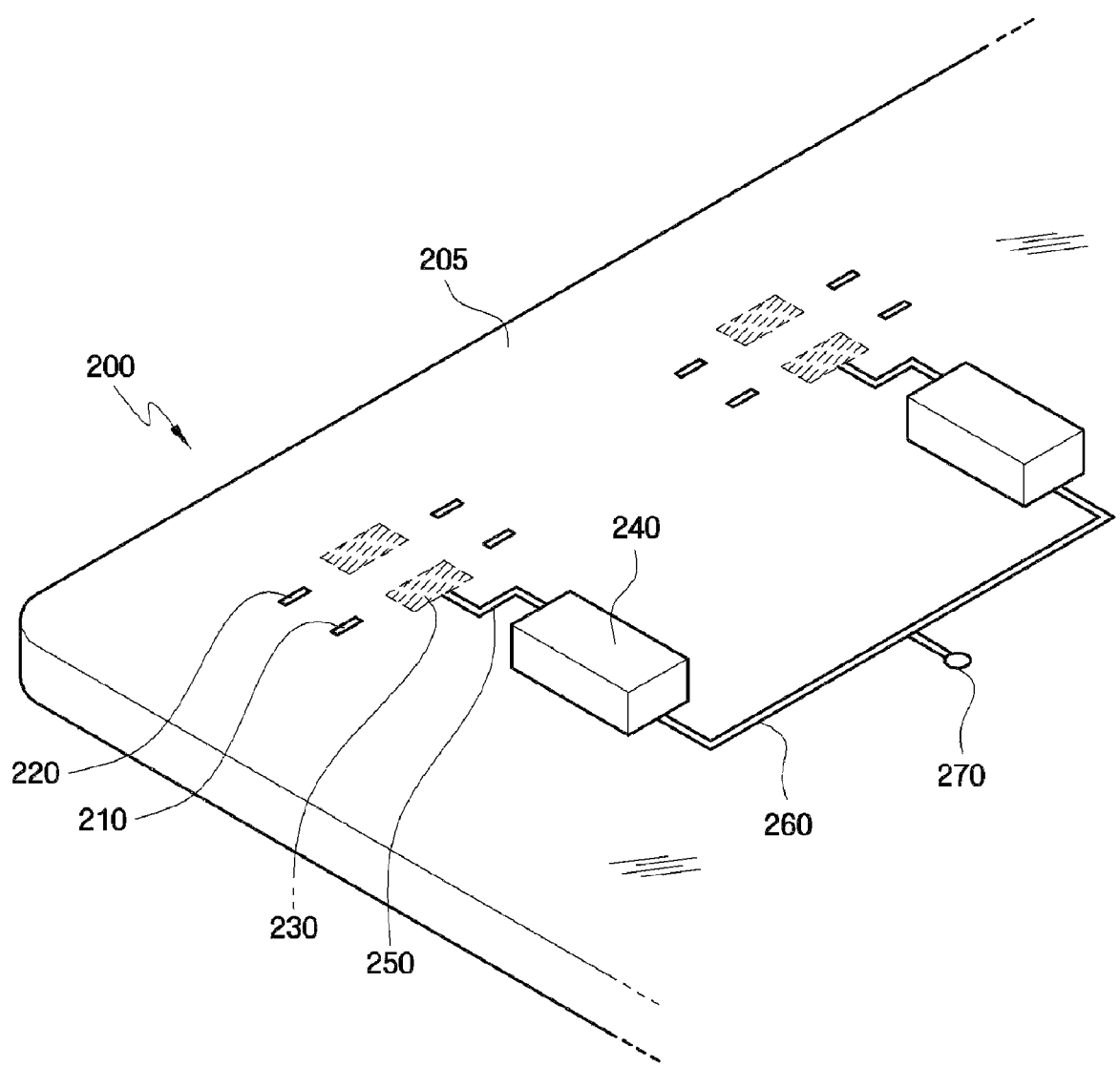
FIG. 2 is a partial perspective view of an exemplary lamp-driving printed circuit board ("PCB") included in the exemplary backlight assembly according to the first exemplary embodiment of the present invention.
Figure 3:
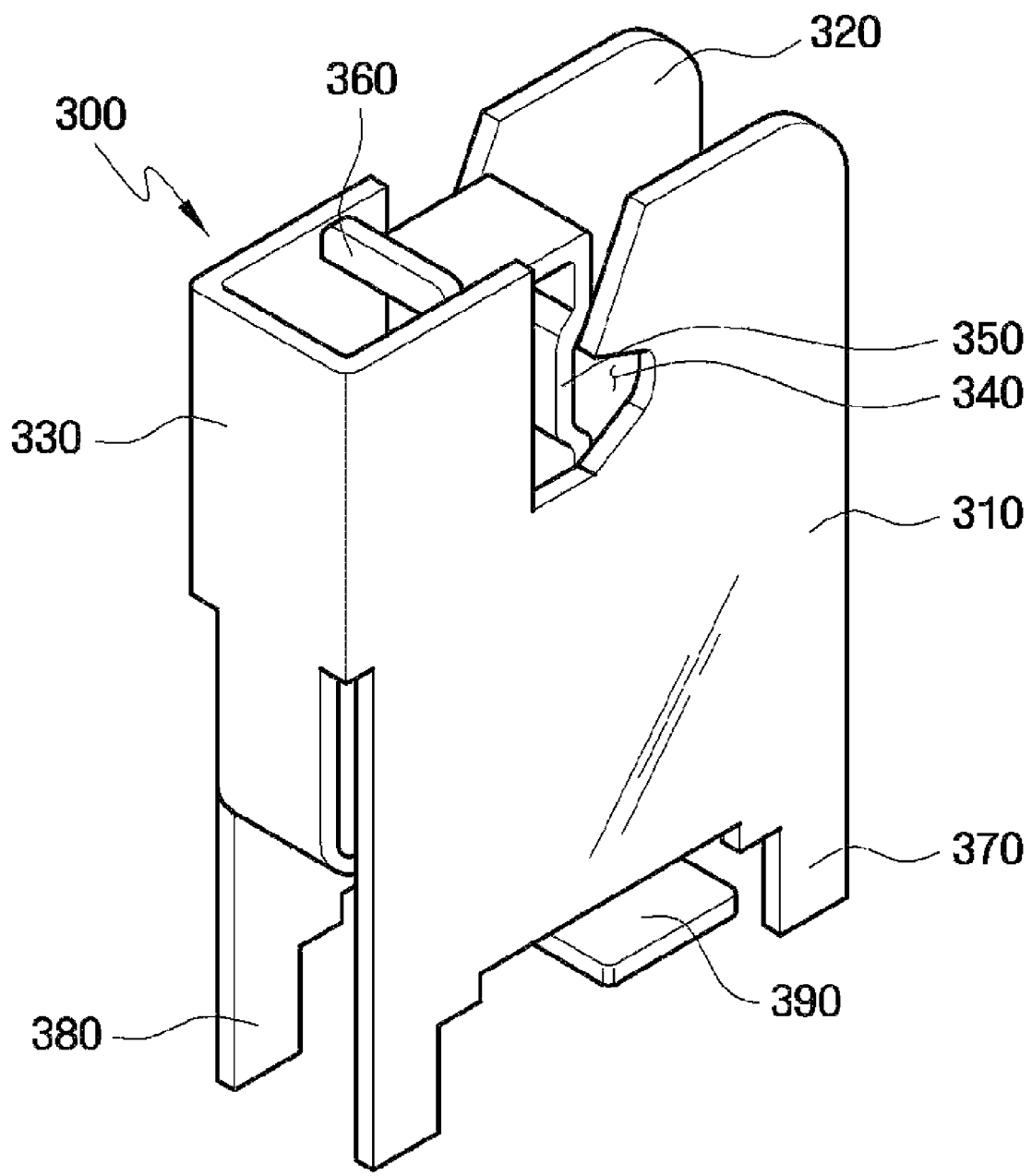
FIG. 3 is a perspective view of an exemplary socket included in the exemplary backlight assembly according to the first exemplary embodiment of the present invention.

Hereinafter, the lamp-driving PCBs 200 included in the backlight assembly according to the first exemplary embodiment will be described in detail with reference to FIGS. 1 through 3. FIG. 2 is a partial perspective view of one of the exemplary lamp-driving PCBs 200 included in the exemplary backlight assembly according to the first exemplary embodiment of the present invention. FIG. 3 is a perspective view of one of the exemplary sockets 300 included in the exemplary backlight assembly according to the first exemplary embodiment of the present invention.

While the two lamp-driving PCBs 200 are respectively disposed at both sides of the lower case 150 in FIG. 1, in an alternative exemplary embodiment, only one PCB 200 may also be disposed at a side of the lower case 150. The lamp-driving PCBs 200 are disposed parallel to the short surfaces of the lower case 150, respectively. However, the present invention is not limited thereto. That is, the lamp-driving PCBs 200 may also be disposed in various ways.

Each of the lamp-driving PCBs 200 includes a plurality of pairs of first socket-fixing grooves 210, a plurality of pairs of second socket-fixing grooves 220, a plurality of pairs of conductive pads 230, a power-applying unit 270, and capacitors 240 on a substrate 205. The power-applying unit 270 drives the lamps 110 and is connected to an external power source. The capacitors 240 distribute power to the lamps 110 from the power-applying unit 270.

Each pair of the first socket-fixing grooves 210 is disposed at a position corresponding to the position of a pair of first fixing protrusions 370 of each of the sockets 300 such that the pair of the first fixing protrusions 370 can be inserted and thus fixed to each pair of the first socket-fixing grooves 210. The pairs of the first socket-fixing grooves 210 are arranged in a straight line at predetermined intervals such that the sockets 300 can be fixed to the pairs of the first socket-fixing grooves 210, respectively.

When each of the sockets 300 includes a pair of second fixing protrusions 380, the pair of the second fixing protrusions 380 are inserted into each pair of the second socket-fixing grooves 220. The pairs of the second socket-fixing grooves 220 may be arranged parallel to the pairs of the first socket-fixing grooves 210.

The conductive pads 230 deliver power signals from the substrate 205 to the sockets 300. That is, each of the conductive pads 230 is disposed adjacent to a corresponding pair of the first socket-fixing grooves 210 and/or a corresponding pair of the second socket-fixing grooves 220. Each conductive pad 230 may be disposed between a pair of the first socket-fixing grooves 210 or between a pair of the second socket-fixing grooves 220. Thus, the conductive pads 230 are electrically connected to the sockets 300. Specifically, the pairs of the conductive pads 230 are allocated to the sockets 300, respectively, and disposed parallel to a side of each of the lamp-driving PCBs 200. In addition, one of the conductive pads 230 in each pair contacts a first fixing platform 390 of a first plate 310 included in a corresponding one of the sockets 300. When the socket 300 is disposed on the lamp driving PCB 200, the first fixing platform 390 lies in a plane substantially parallel to a plane of the conductive pad 230, such that the first fixing platform 390 contacts the conductive pad 230 in a face to face relationship. The conductive pads 230 may be made of a highly conductive material such as copper or silver.

The capacitors 240 of each of the lamp-driving PCBs 200 are allocated to the lamps 110, respectively. The capacitors 240 may directly contact the sockets 300, respectively, and distribute a driving voltage, which is applied to each of the lamp-driving PCBs 200, to the sockets 300, respectively. Accordingly, the lamps 110 connected to the capacitors 240, respectively, can receive a driving voltage that is accurately controlled. In addition, even when one of the lamps 110 is broken, the other lamps 110 can still be driven, thereby extending the life of the backlight assembly.

A plurality of the capacitors 240 mounted on the substrate 205 may be connected to the power-applying unit 270 to receive power from an external power source.

The power-applying unit 270 applies power to a plurality of the capacitors 240 through second wiring 260, and each of the capacitors 240 in each pair distributes the power to a corresponding one or pair of the conductive pads 230 through first wiring 250.

Referring to FIGS. 2 and 3, each of the sockets 300 may have a conductive body. The conductive body may be made of a conductive material such as metal. In an exemplary embodiment, the conductive body may be made of phosphor bronze. The conductive body is connected to each pair of the conductive pads 230 and each of the lamp electrodes 112 to deliver a driving voltage to each of the lamps 110. The conductive body is surface-mounted on each pair of the conductive pads 230, and each of the lamp electrodes 112 is fixed to the conductive body by a leaf spring and first and second guide grooves 340.

The conductive body includes the first plate 310 which has the first guide groove 340 and which is disposed perpendicular to a surface of each of the lamp-driving PCBs 200. The conductive body further includes a second plate 320 and a third plate 330. The second plate 320 has the second guide groove 340 which overlaps the first guide groove 340. In addition, the second plate 320 is separated from the first plate 310 to face the first plate 310. The first plate 310 may be substantially parallel to the second plate 320. The third plate 330 connects the first plate 310 to the second plate 320. Since the first plate 310 and the second plate 320 are connected to each other by the third plate 330, the conductive body may be shaped like "U" or have a substantially U-shaped cross-section.

Each of the sockets 300 may further include the leaf spring. The leaf spring includes a third guide groove 350 at a position corresponding to the position of the first guide groove 340 and the leaf spring is interposed between the first and second plates 310 and 320.

The leaf spring securely fixes each of the lamp electrodes 112 to a corresponding one of the sockets 300. The relationship between each of the lamps 110 and the leaf spring will be described in detail later, together with the first and second guide grooves 340.

The first plate 310 according to an exemplary embodiment may include a pair of the first fixing protrusions 370 which are insertable into each pair of the first socket-fixing grooves 210, the first guide groove 340 into which each of the lamp electrodes 112 (see FIG. 1) is inserted, and the first fixing platform 390 which protrudes from the first plate 310 to be surface-mounted on one of the conductive pads 230 in each pair.

The first fixing platform 390 protrudes from the first plate 310, which is disposed perpendicular to each of the lamp-driving PCBs 200, and is disposed parallel to a surface of the substrate 205 of each of the lamp-driving PCBs 200. The first fixing platform 390 is surface-mounted on one of the conductive pads 230 in each pair and receives power from a corresponding one of the lamp-driving PCBs 200. Although not shown in the drawings, a second fixing platform (not shown) may be formed at an end of the second plate 320 to correspond to the first fixing platform 390. Thus, the first fixing platform 390 may be disposed on a conductive pad 230 disposed between a pair of the first socket-fixing grooves 210, and the second fixing platform may be disposed on a conductive pad 230 disposed between a pair of the second socket-fixing grooves 220. Specifically, the first fixing platform 390 and the second fixing platform may be soldered and thus fixed to each pair of the conductive pads 230, respectively.

The pair of the first fixing protrusions 370 may be tightly fitted into each pair of the first socket-fixing grooves 210. The second plate 320 has a pair of the second fixing protrusions 380, and the pair of the second fixing protrusions 380 may be tightly fitted into each pair of the second socket-fixing grooves 220.

Each of the sockets 300 according to an exemplary embodiment may be securely fixed to a corresponding one of the lamp-driving PCBs 200 by four fixing protrusions, i.e., a pair of the first fixing protrusions 370 and a pair of the second fixing protrusions 380, the first fixing platform 390, and the second fixing platform.

Figure 4A:
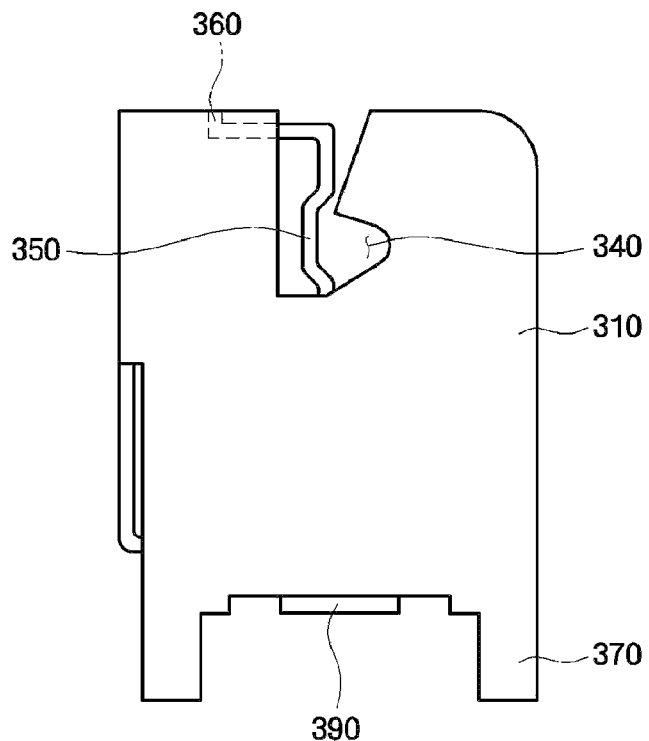
FIGS. 4A and 4B are front views of the exemplary socket included in the exemplary backlight assembly according to the first exemplary embodiment of the present invention.
Figure 4B:
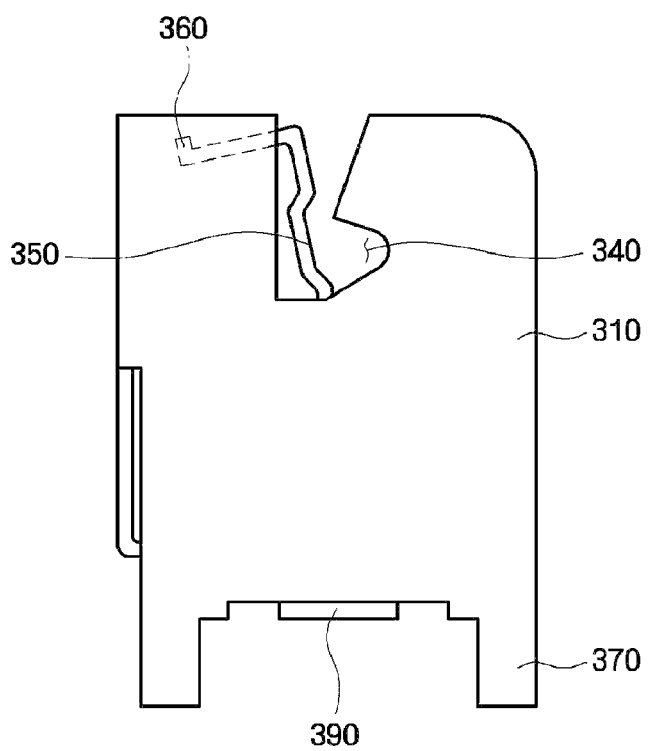
Figure 5:
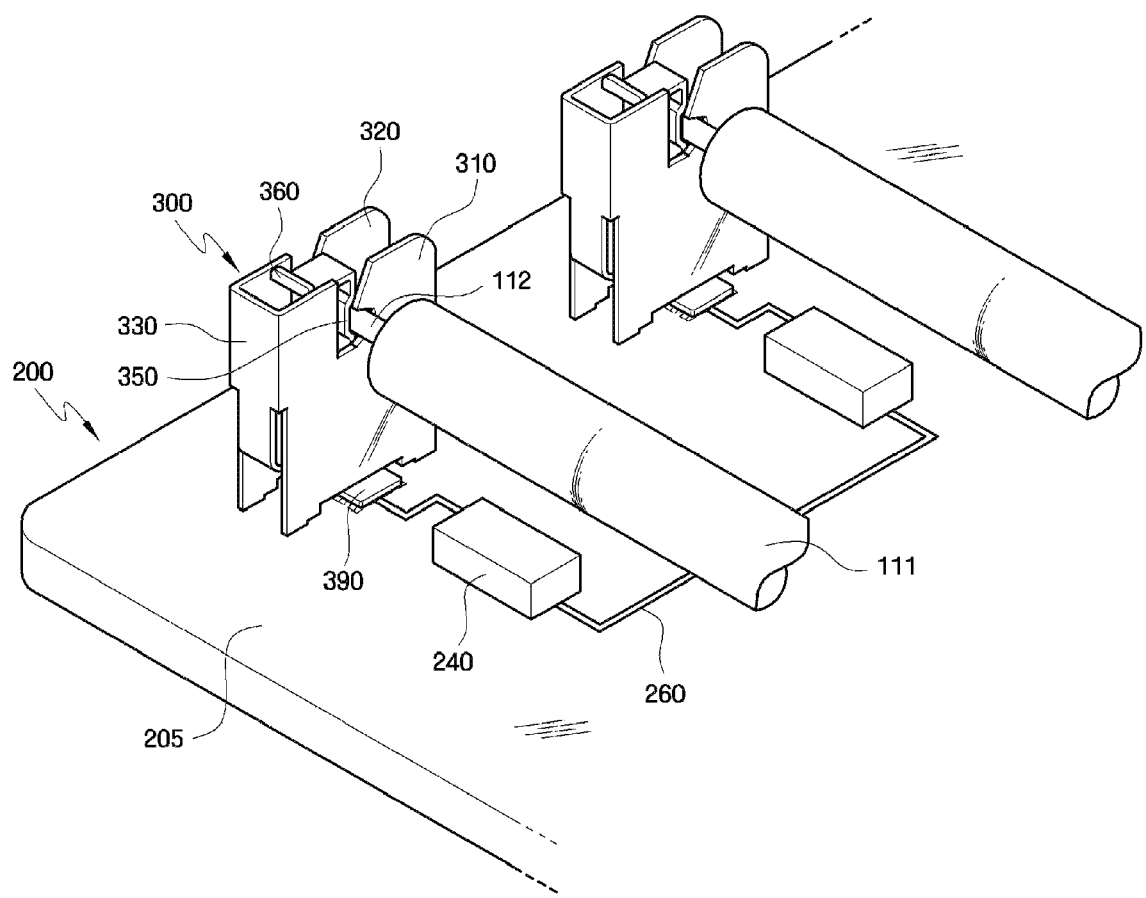
FIG. 5 is a partial perspective view of the exemplary backlight assembly according to the first exemplary embodiment of the present invention in which the exemplary lamp-driving PCB shown in FIG. 2 is coupled to the exemplary sockets shown in FIG. 3.

The relationship between the sockets 300, the lamps 110, and the lamp-driving PCBs 200 will now be described in detail with reference to FIGS. 4A through 5. FIGS. 4A and 4B are front views of one of the exemplary sockets 300 included in the exemplary backlight assembly according to the first exemplary embodiment of the present invention. FIG. 5 is a partial perspective view of the exemplary backlight assembly according to the first exemplary embodiment of the present invention in which the lamp-driving PCB 200 shown in FIG. 2 is coupled to the exemplary sockets 300 shown in FIG. 3.

Referring to FIG. 4A, the first guide groove 340 is formed by cutting the first plate 310 to a predetermined depth from an upper end of the first plate 310. In addition, the first guide groove 340 is bent. Specifically, the first guide groove 340 has an open portion at the upper end of the first plate 310, at an end opposite an end from where the first fixing protrusions 370 extend. The first guide groove 340 also has a vertical portion and an inner portion. The vertical portion extends downward from the open portion in a substantially vertical direction, and the inner portion protrudes from a side of the vertical portion in a horizontal direction to be substantially perpendicular to the vertical portion. That is, the first guide groove 340 may be somewhat "L-shaped". Alternatively, the inner portion may protrude from both sides of the vertical portion. Thus, the first guide groove 340 may be shaped like a reverse "T" or somewhat upside down T-shaped. A second guide groove provided on the second plate 320 may have substantially the same shape as the first guide groove 340.

The first guide groove 340 and second guide groove can have any shape as long as each of the lamp electrodes 112 can be introduced into the open portion of the first guide groove 340 and second guide groove and contact and be fixed to an end of the inner portions. In order to allow each of the lamp electrodes 112 to be easily introduced into the open portions and securely fixed to the end of the inner portions, the width of the first guide groove 340 and second guide groove may be gradually reduced and tapered.

The leaf spring applies an external force to the first guide groove 340 and second guide groove to securely fix each of the lamp electrodes 112 to the inner portion of the first guide groove 340 and second guide groove. The leaf spring includes the third guide groove 350 to surface-contact each of the lamp electrodes 112. In a front plan view as shown in FIG. 4A and FIG. 4B, the third guide groove 350 faces the inner portion of the first guide groove 340 and the second guide groove. Thus, each of the lamp electrodes 112 can be securely fixed to the third guide groove 350. The leaf spring further includes a leaf spring grip portion 360 in an upper part thereof, adjacent an upper end of the first plate 310 and second plate 320. Therefore, a worker can easily insert each of the lamp electrodes 112 into the first guide groove 340 by controlling the distance between the third guide groove 350 and the first guide groove 340 and second guide groove by pulling the leaf spring grip portion 360 with his or her hand (see FIG. 4B), such that the leaf spring may be temporarily pivoted away from the first guide groove 340 and second guide groove.

Referring to FIG. 5, the lamp electrodes 112 are electrically connected to the conductive sockets 300. Each of the capacitors 240 distributes power to a corresponding pair of the conductive pads 230 via the first wiring 250. Then, the power is delivered to a corresponding one of the lamp electrodes 112 via one of the sockets 300 which is connected to the corresponding pair of the conductive pads 230 through the first fixing platform 390.

In the backlight assembly according to the present embodiment, the sockets 300 are coupled to the lamp-driving PCBs 200. Thus, the thickness of the backlight assembly can be reduced. In addition, since parts, such as a socket alignment plate and an inverter-insulating member, are not required, the number of parts included in the backlight assembly can be reduced. Furthermore, since the socket alignment plate is omitted, there is no need to use a plastic material to form the socket alignment plate. As a result, environmental problems, such as halogen contamination, can be prevented.

Figure 6:
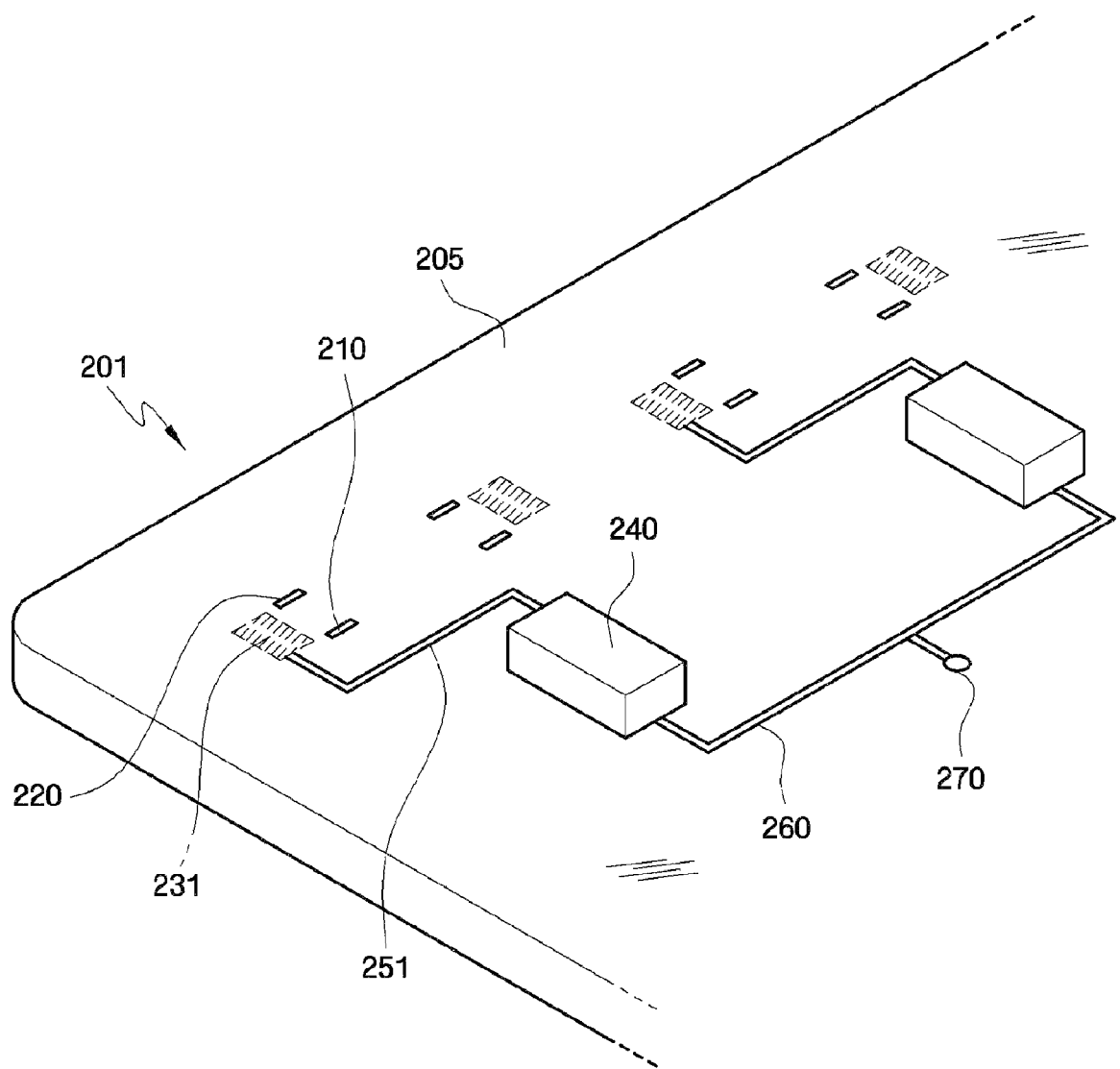
FIG. 6 is a partial perspective view of an exemplary lamp-driving PCB included in the exemplary backlight assembly according to a second exemplary embodiment of the present invention.
Figure 7:
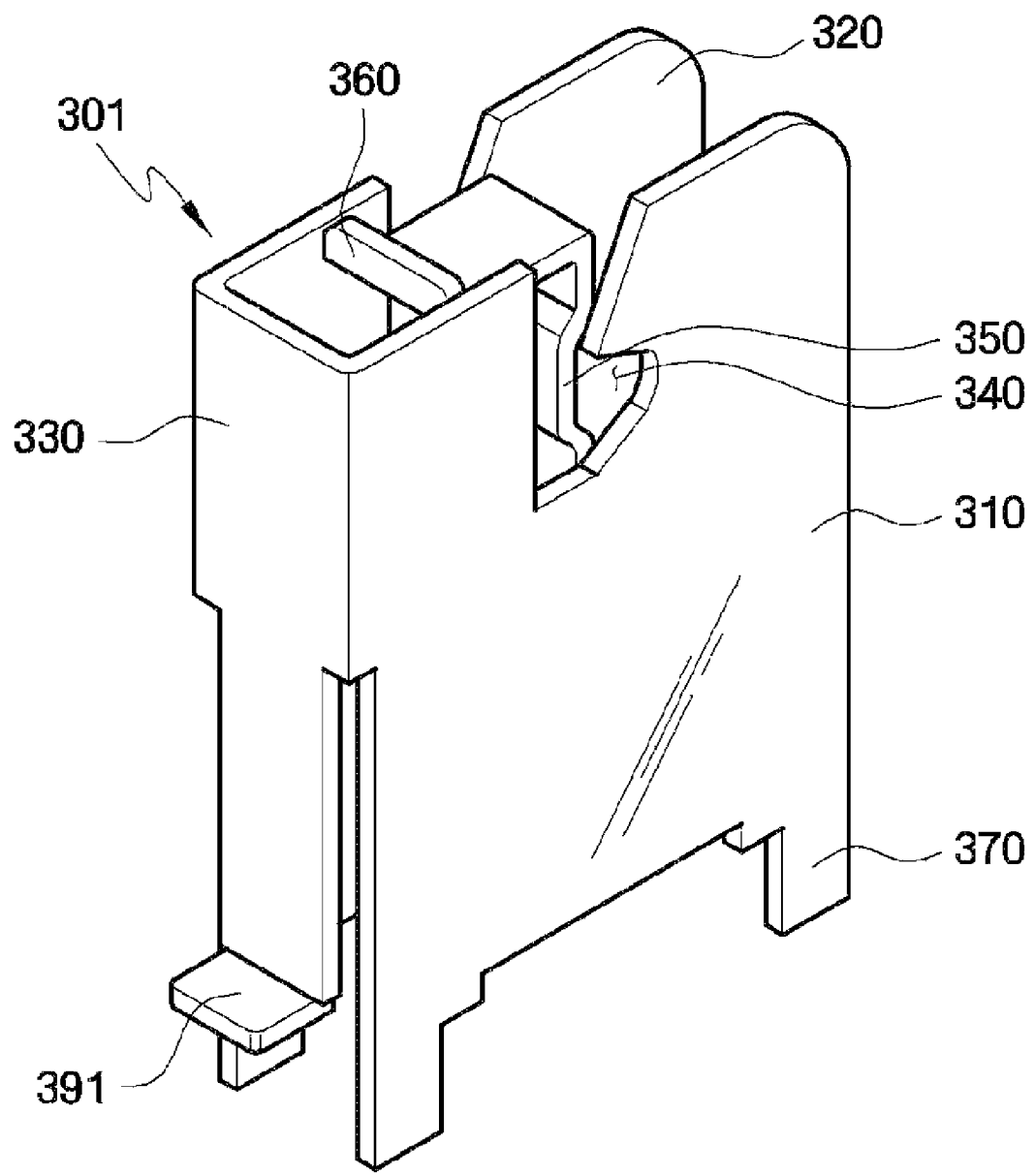
FIG. 7 is a perspective view of an exemplary socket included in the exemplary backlight assembly according to the second exemplary embodiment of the present invention.
Figure 8:
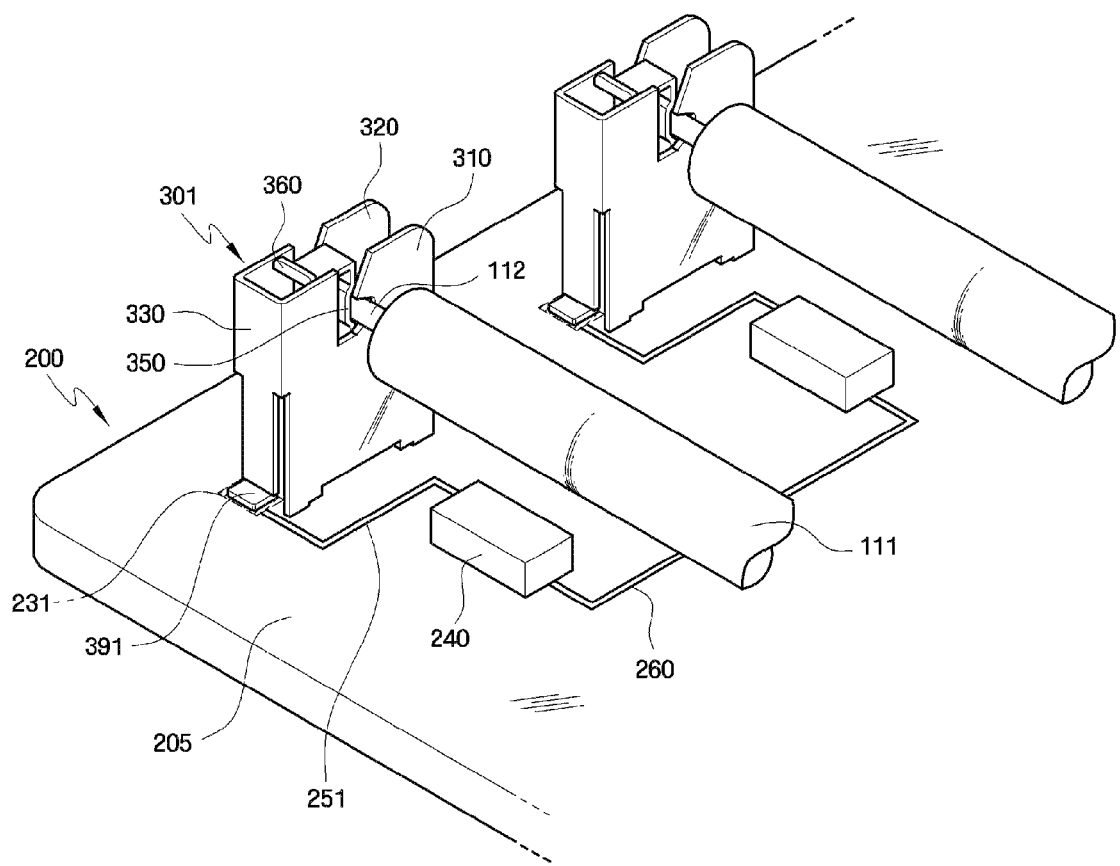
FIG. 8 is a partial perspective view of the exemplary backlight assembly according to the second exemplary embodiment of the present invention in which the exemplary lamp-driving PCB shown in FIG. 6 is coupled to the exemplary sockets shown in FIG. 7.

Hereinafter, a backlight assembly according to a second exemplary embodiment of the present invention will be described in detail with reference to FIGS. 6 through 8. FIG. 6 is a partial perspective view of an exemplary lamp-driving PCB 201 included in the exemplary backlight assembly according to the second exemplary embodiment of the present invention. FIG. 7 is a perspective view of one exemplary socket 301 included in the exemplary backlight assembly according to the second exemplary embodiment of the present invention. FIG. 8 is a partial perspective view of the exemplary backlight assembly according to the second exemplary embodiment of the present invention in which the exemplary lamp-driving PCB 201 shown in FIG. 6 is coupled to the exemplary sockets 301 shown in FIG. 7. In the following embodiments of the present invention, elements having the same or substantially same functions as those of the first exemplary embodiment are indicated by like reference numerals, and thus their description will be omitted or simplified.

Referring to FIG. 6, the lamp-driving PCB 201 according to the present embodiment includes a plurality of conductive pads 231 which are formed adjacent to a plurality of first socket-fixing grooves 210 and a plurality of second socket-fixing grooves 220, respectively. That is, one of the conductive pads 231 in each pair is formed at a position where a third plate 330 (see FIG. 7) of a corresponding one of the sockets 301 (see FIG. 7) is to be disposed. Accordingly, first wiring 251 extends on a substrate 205 to the position where the third plate 330 is to be disposed.

Referring to FIGS. 7 and 8, each of the sockets 301 according to the present embodiment includes a first fixing platform 391 which protrudes from a bottom portion of the third plate 330 in a direction perpendicular to the third plate 330. That is, unlike the first fixing platform 390 which protrudes from the first plate 310 according to the first exemplary embodiment, the first fixing platform 391 according to the second exemplary embodiment protrudes from the third plate 330. Thus, power supplied from an external power source is delivered to each of the sockets 301 via the first fixing platform 391. In an exemplary embodiment, a first fixing platform 391 may also depend from a side of the socket 301 which is opposite the third plate 330, in which case the additional first fixing platform 391 may contact an additional conductive pad 231 which is formed adjacent first and second socket fixing grooves 210, 220 in the pairs of first and second socket fixing grooves 210, 220. The pairs of socket fixing grooves 210, 220 may thus be disposed between the pair of conductive pads 231.

Figure 9:
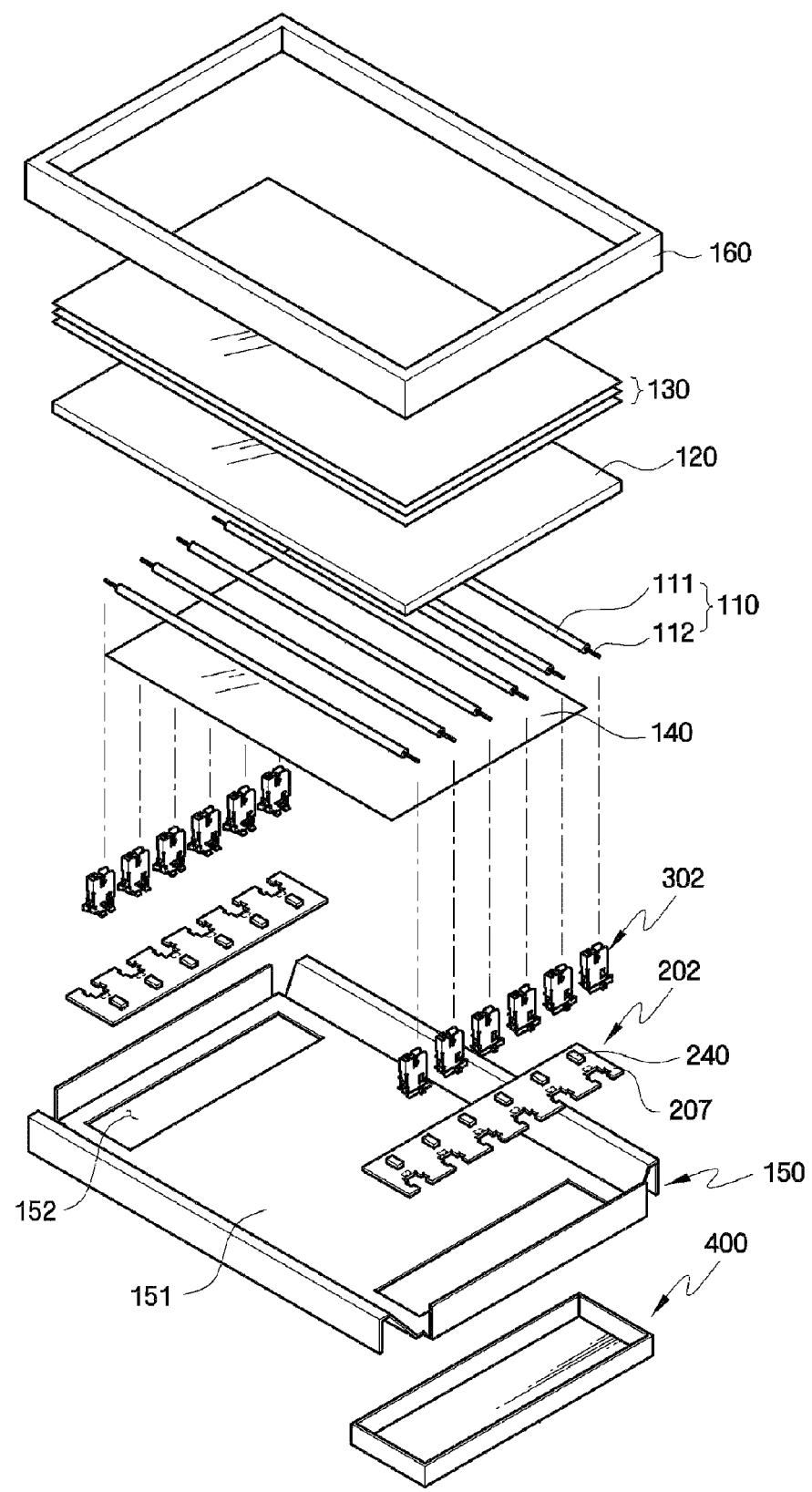
FIG. 9 is an exploded perspective view of an exemplary backlight assembly according to a third exemplary embodiment of the present invention.
Figure 10:
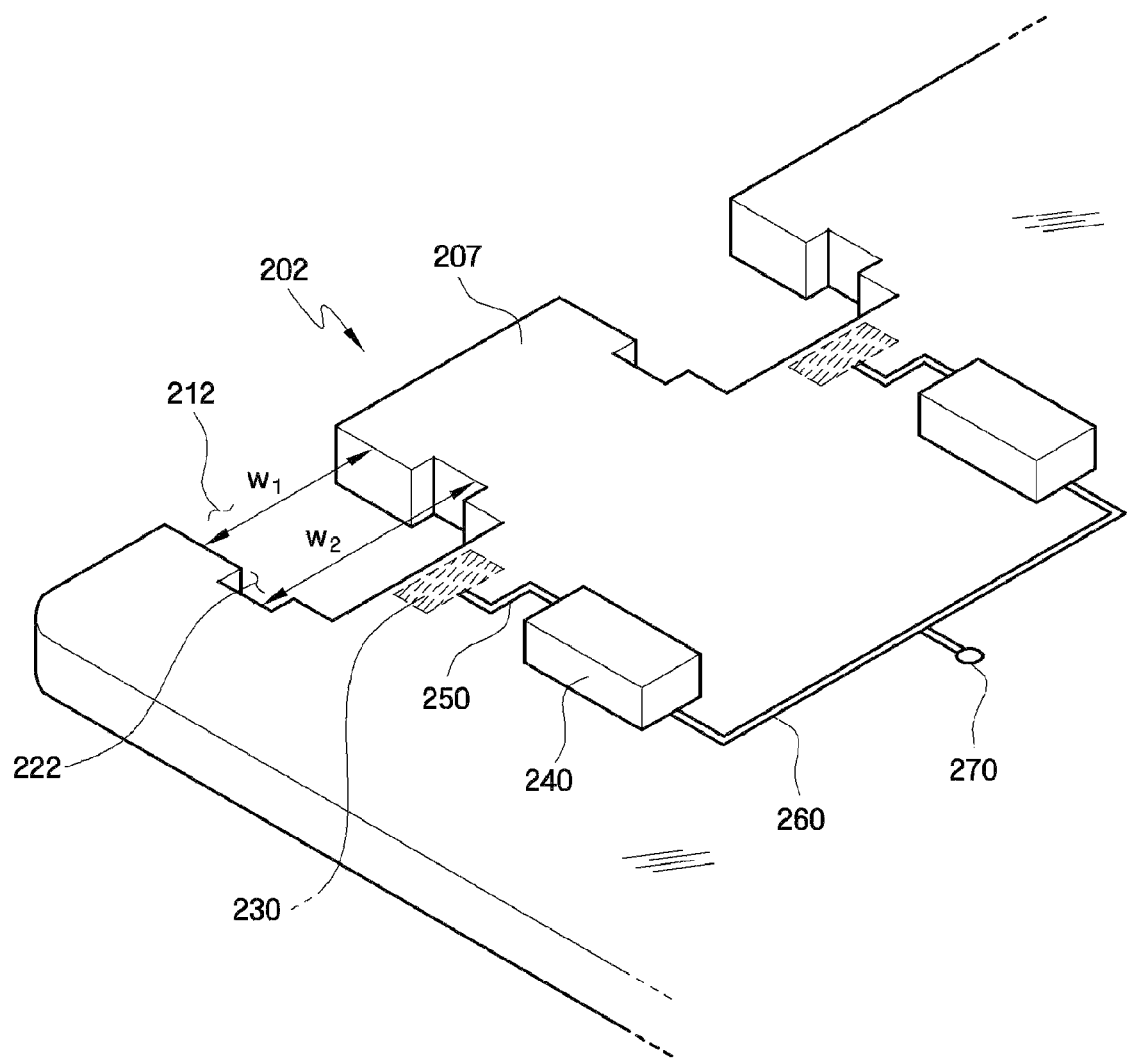
FIG. 10 is a partial perspective view of an exemplary lamp-driving PCB included in the exemplary backlight assembly according to the third exemplary embodiment of the present invention.
Figure 11:
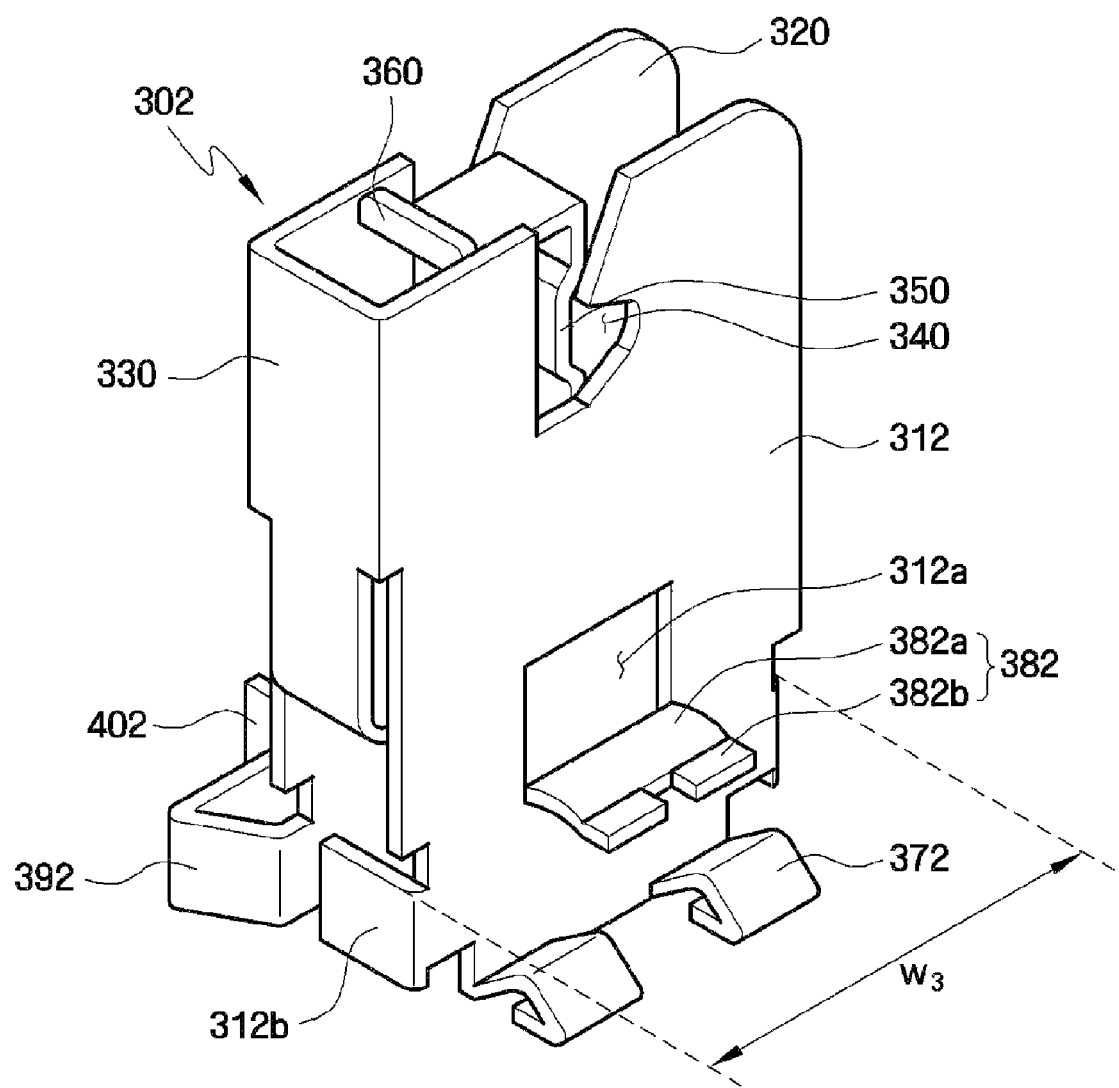
FIG. 11 is a perspective view of an exemplary socket included in the exemplary backlight assembly according to the third exemplary embodiment of the present invention.
Figure 12:
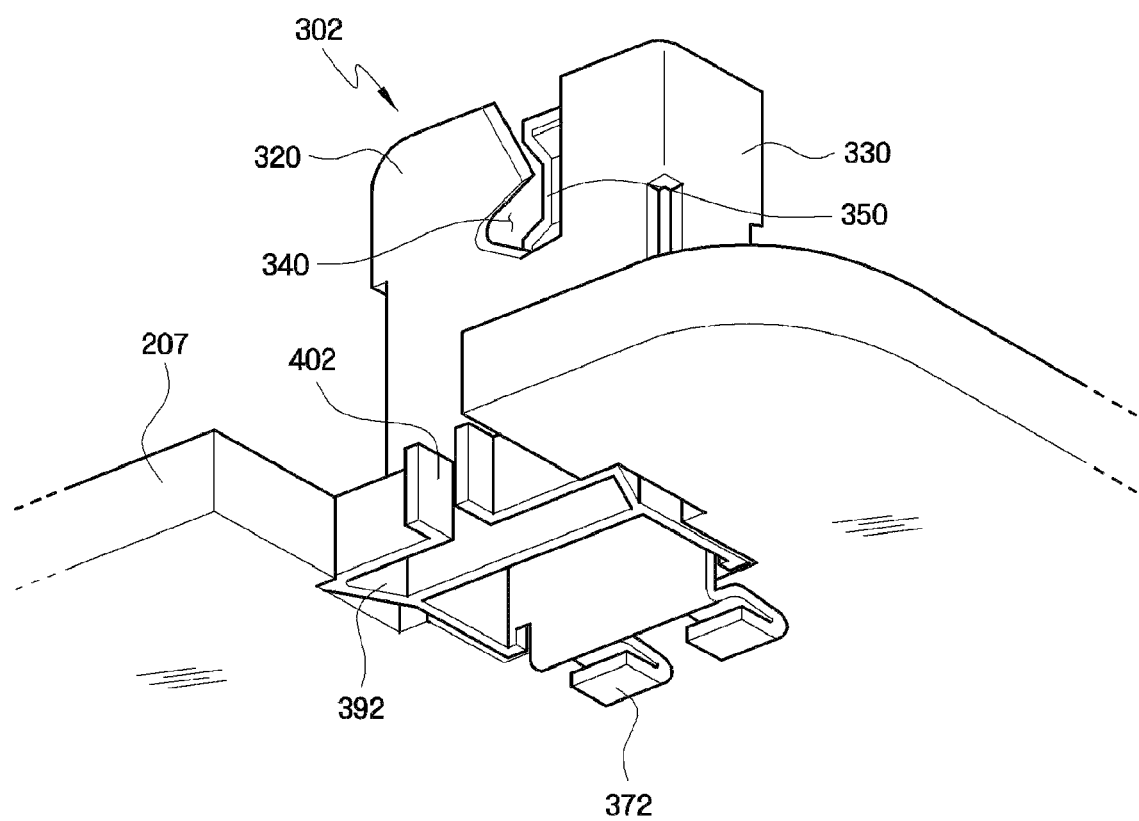
FIG. 12 is a bottom perspective view of the exemplary socket coupled to the exemplary lamp-driving PCB which is shown in FIG. 10 and included in the exemplary backlight assembly according to the third exemplary embodiment of the present invention.
Figure 13:
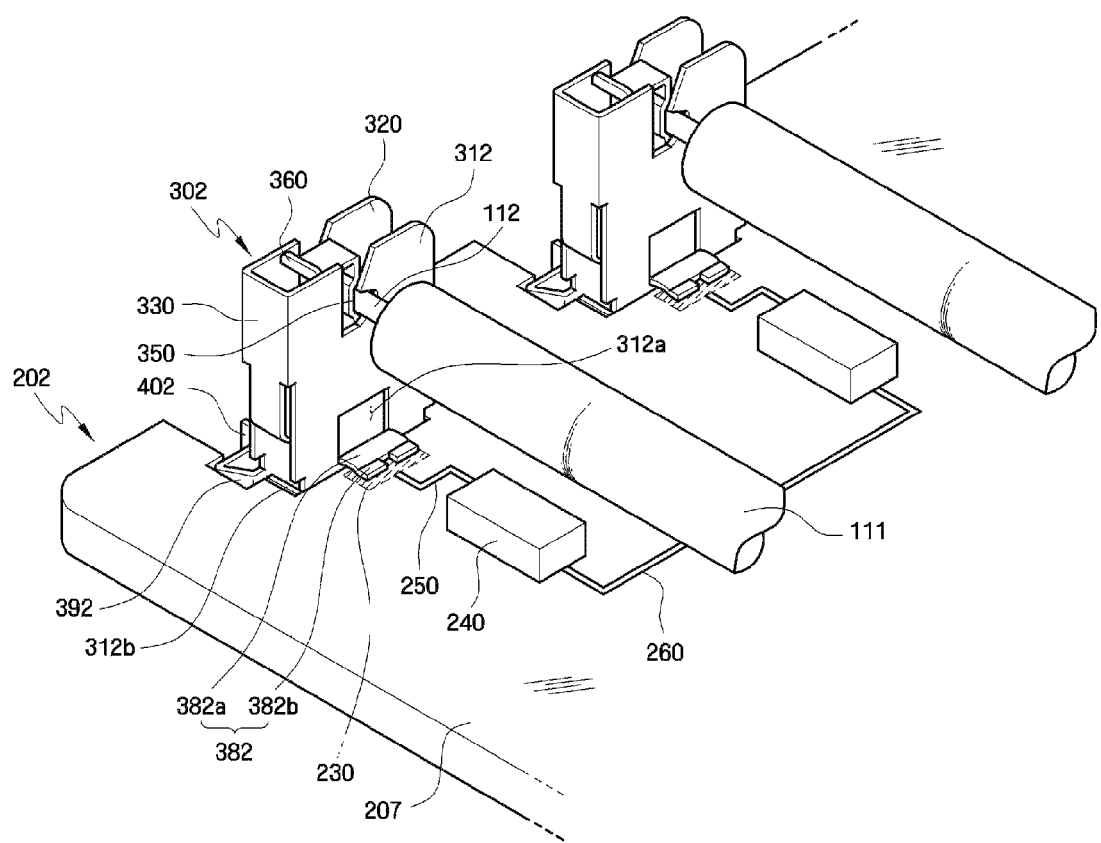
FIG. 13 is a partial perspective view of the exemplary backlight assembly according to the third exemplary embodiment of the present invention in which the exemplary lamp-driving PCB shown in FIG. 10 is coupled to the exemplary sockets shown in FIG. 11.

Hereinafter, a backlight assembly according to a third exemplary embodiment of the present invention will be described in detail with reference to FIGS. 9 through 13. FIG. 9 is an exploded perspective view of the exemplary backlight assembly according to the third exemplary embodiment of the present invention. FIG. 10 is a partial perspective view of one exemplary lamp-driving PCB 202 included in the exemplary backlight assembly according to the third exemplary embodiment of the present invention. FIG. 11 is a perspective view of one exemplary socket 302 included in the exemplary backlight assembly according to the third exemplary embodiment of the present invention. FIG. 12 is a bottom perspective view of one exemplary socket 302 coupled to the exemplary lamp-driving PCB 202 which is shown in FIG. 10 and included in the exemplary backlight assembly according to the third exemplary embodiment of the present invention. FIG. 13 is a partial perspective view of the exemplary backlight assembly according to the third exemplary embodiment of the present invention in which the exemplary lamp-driving PCB 202 shown in FIG. 10 is coupled to the exemplary sockets 302 shown in FIG. 11.

Referring to FIGS. 9 through 11, a pair of lamp-driving PCBs 202 may be provided on opposite sides of the lower case 150. Each of the lamp-driving PCBs 202 includes a plurality of socket insertion grooves 212 indented from a side thereof. The socket insertion grooves 212 may be formed by repeatedly cutting an end of a substrate 207 in the shape of "U" such that a plurality of spaced socket insertion grooves 212 are disposed along a long side of the substrate 207.

A width $w_1$ of each of the socket insertion grooves 212 may be equal to, or substantially equal to, a width $w_3$ of a first plate 312 of each of the sockets 302. Each of the socket insertion grooves 212 may include a socket stop groove 222 that includes indentations into the substrate 207 on opposing sides of the socket insertion groove 212, and a width $w_2$ of the socket stop groove 222 may be greater than the width $w_1$ of each of the socket insertion grooves 212.

Each of the sockets 302 has a conductive body which includes a vertical fixing portion and a horizontal fixing portion 392. The vertical fixing portion grips each of the lamp-driving PCBs 202 in a vertical direction, and the horizontal fixing portion 392 is coupled to each of the socket insertion grooves 212 in a horizontal direction.

The vertical fixing portion contacts each of conductive pads 230 to receive power distributed by a corresponding one of capacitors 240 and delivers the power to a corresponding one of lamps 110. The vertical fixing portion includes a pair of first fixing platforms 372 which contacts a lower surface of each of the lamp-driving PCBs 202 and a second fixing platform 382 which contacts each of the conductive pads 230. In this case, the lower surface of each of the lamp-driving PCBs 202 is opposite to an upper surface of each of the lamp-driving PCBs 202, where the conductive pads 230 and capacitors 240 are disposed on the upper surface thereof.

The pair of the first fixing platforms 372 protrudes from a lower end of the first plate 312 and supports the bottom of each of the lamp-driving PCBs 202, such that the first fixing platforms 372 press against the lower surface of each of the lamp-driving PCBs 202. While the pair of the first fixing platforms 372 is formed to securely support the bottom of each of the lamp-driving PCBs 202 as shown in the drawings, the present invention is not limited thereto. That is, only one first fixing platform 372 may also be formed, or more than two first fixing platforms 372 may also be formed.

The second fixing platform 382 includes a curved portion 382a and a pair of flat portions 382b. The curved portion 382a protrudes from the first plate 312 at a position adjacent to, but spaced from, the lower end of the first plate 312. The curved portion 382a adds elasticity to the second fixing platform 382, and the pair of the flat portions 382b extend from the curved portion 382a and are connected to each of the conductive pads 230. The second fixing portion 382 may be formed by cutting a portion of the first plate 312 and then bending the cut portion, thereby creating an opening 312a in the first plate 312.

Each of the sockets 302 is guided by a pair of socket guide portions 312b into a corresponding one of the socket insertion grooves 212. The pair of the socket guide portions 312b may be respectively formed to connect the first plate 312 to the second plate 320. In an alternative exemplary embodiment, the socket guide portions 312b may extend from the lower end of the first plate 312 in a direction towards the second plate 320, such that the socket guide portions 312b are substantially parallel to the third plate 330, although the socket guide portions 312b may form a non-perpendicular angle with respect to the first plate 312.

Each of the sockets 302 further includes the horizontal fixing portion 392. The horizontal fixing portion 392 extends from a lower end of the second plate 320 in a direction in which the width of the second plate 320 is increased. The horizontal fixing portion 392 is securely inserted into the socket stop groove 222. That is, the horizontal fixing portion 392 extends from both sides of the second plate 320 and is securely attached to stepped portions of the socket stop groove 222. Thus, the horizontal fixing portion 392 fixes each of the sockets 302 to a corresponding one of the socket insertion grooves 212 in a horizontal direction.

Referring to FIG. 12, each of the sockets 302 may further include a pair of socket grip portions 402 which protrude from the horizontal fixing portion 392 and are used to control the width of the horizontal fixing portion 392 in order to insert or remove each of the sockets 302 into/from a corresponding one of the socket insertion grooves 212. A worker can easily insert or remove each of the sockets 302 into/from a corresponding one of the socket insertion grooves 212 by holding the pair of the socket grip portions 402 to be pressed against each other. By pressing the socket grip portions 402 closer together, a width of the horizontal fixing portion 392 can be reduced so that the socket 302 can be removed from the socket stop groove 222 and the socket insertion groove 212. Thus, the worker can easily repair the sockets 302. When the socket 302 is inserted into the socket insertion groove 212, the horizontal fixing portion 392 fits into the socket stop groove 222, the first fixing platform 372 abuts the lower surface of the substrate 207, and the second fixing platform 382 abuts the upper surface of the substrate 207 to securely hold the socket 302 with respect to the substrate 207.

Referring to FIG. 13, each of lamp electrodes 112 according to the present embodiment receives power which is distributed by a corresponding one of the capacitors 240 to a corresponding one of the sockets 302. Each of the sockets 302 according to the present embodiment can be easily coupled to a corresponding one of the lamp-driving PCBs 202 by the vertical fixing portion (i.e., the first and second fixing platforms 372 and 382) and the horizontal fixing portion 392 thereof. In addition, each of the sockets 302 can be easily decoupled from a corresponding one of the lamp-driving PCBs 202 by using the pair of the socket grip portions 402.

Figure 14:
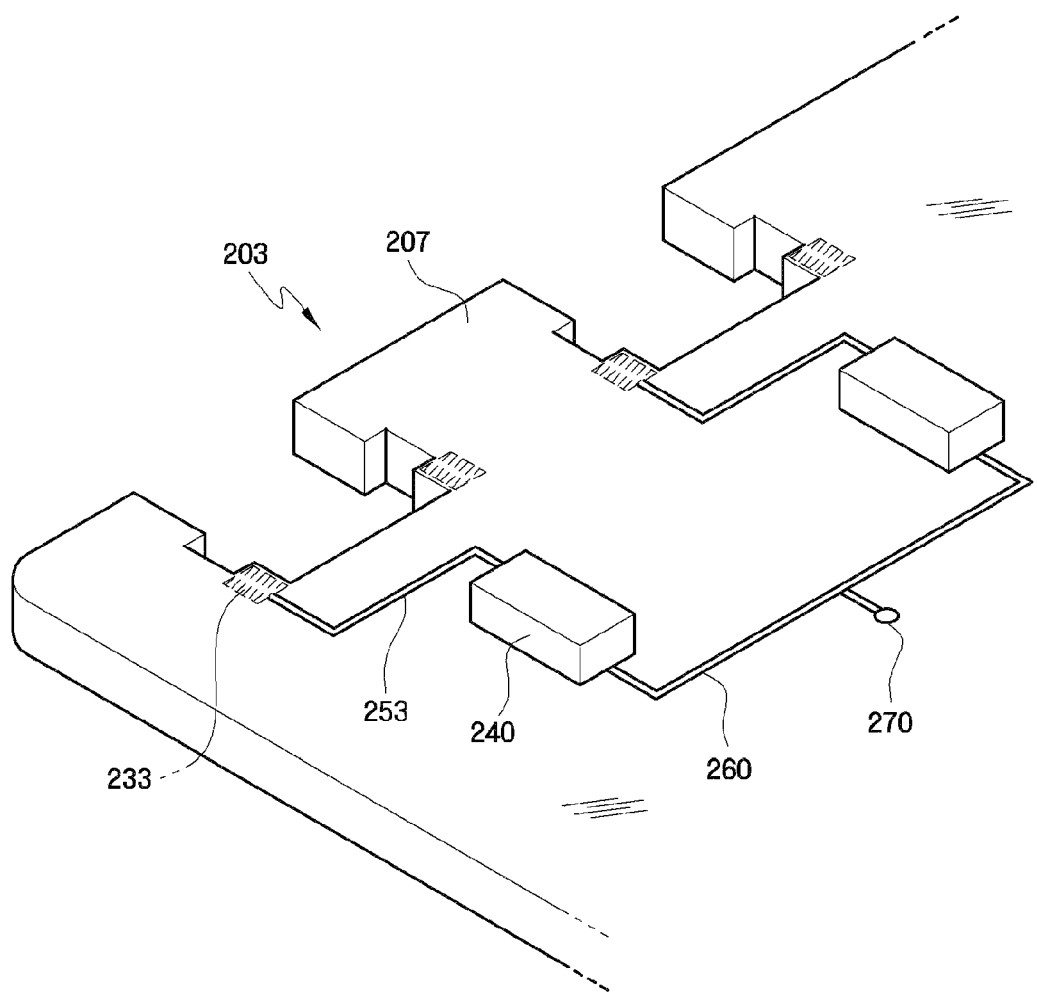
FIG. 14 is a partial perspective view of an exemplary lamp-driving PCB included in an exemplary backlight assembly according to a fourth exemplary embodiment of the present invention.
Figure 15:
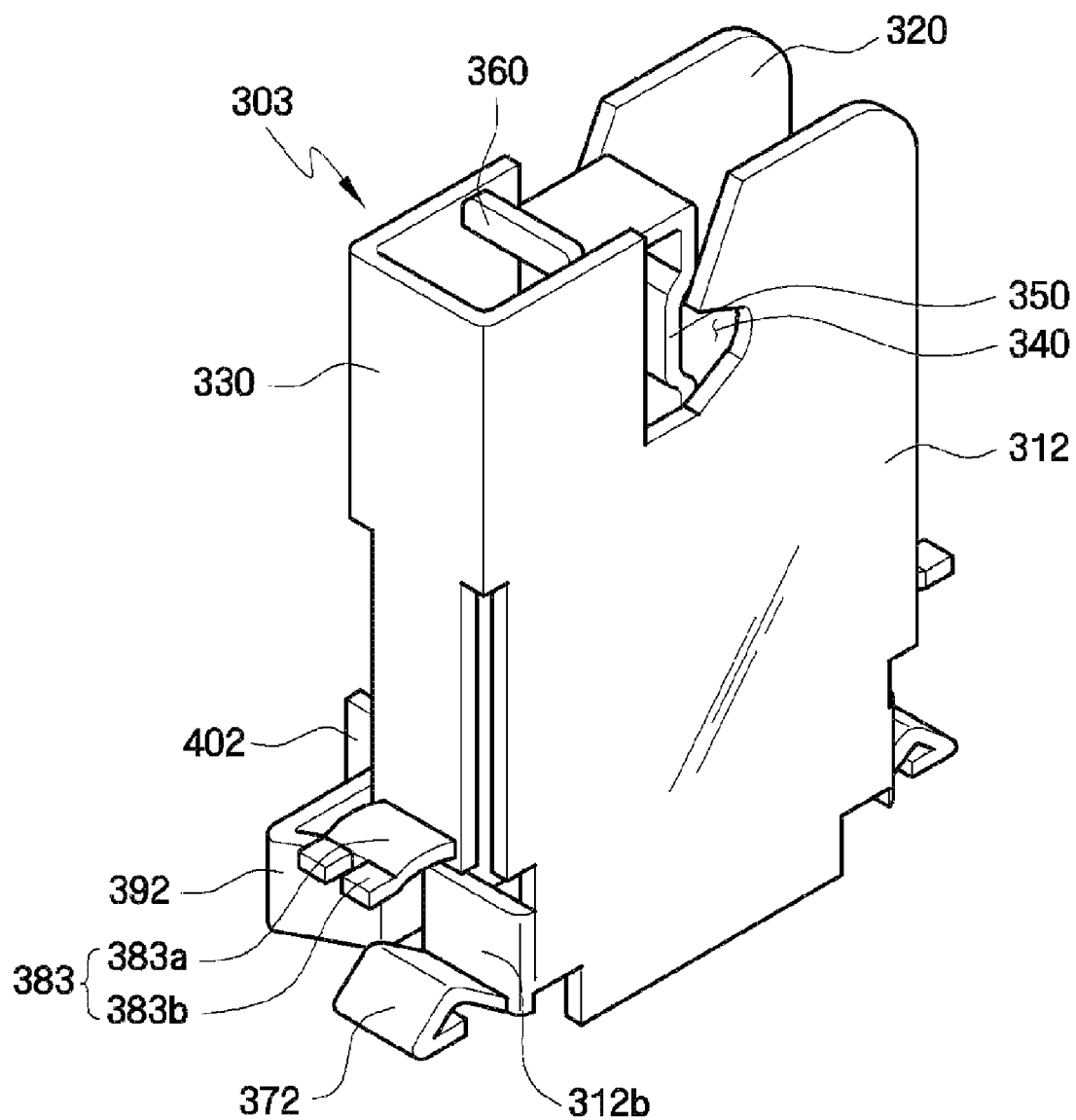
FIG. 15 is a perspective view of an exemplary socket included in the exemplary backlight assembly according to the fourth exemplary embodiment of the present invention.
Figure 16:
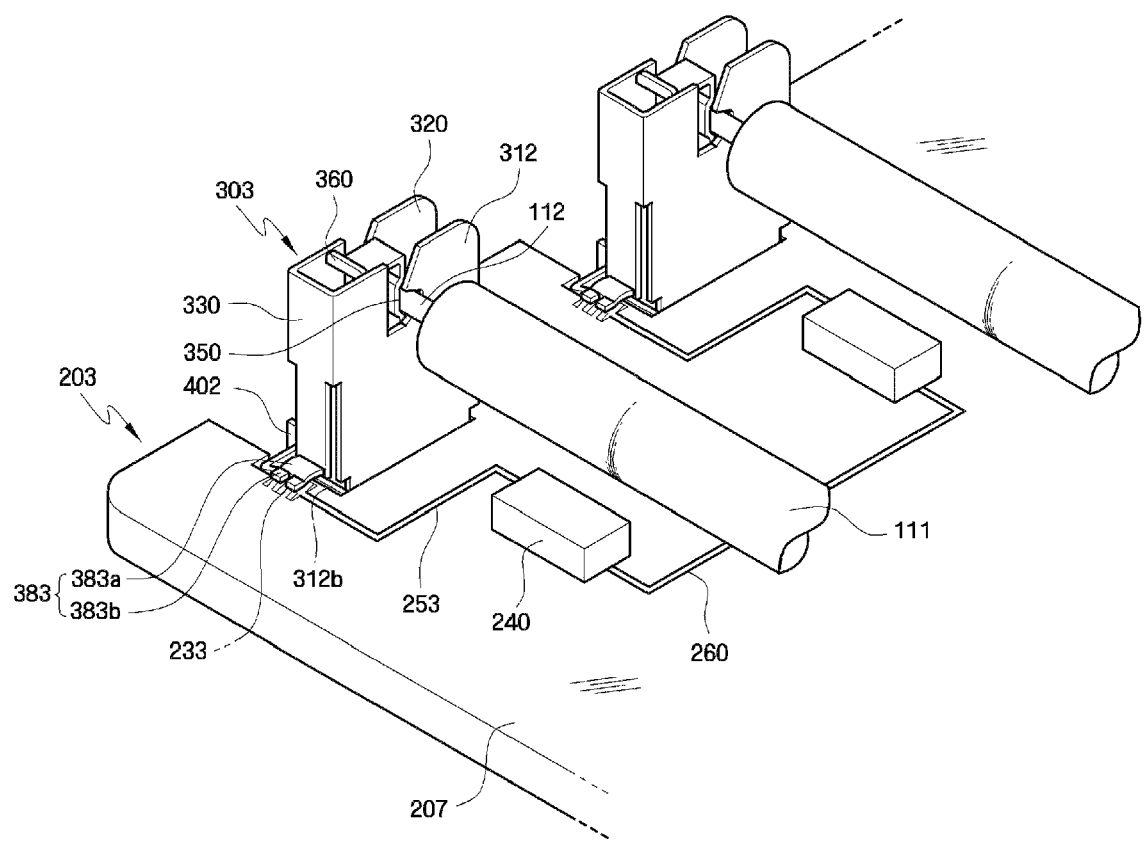
FIG. 16 is a partial perspective view of the exemplary backlight assembly according to the fourth exemplary embodiment in which the exemplary lamp-driving PCB shown in FIG. 14 is coupled to the exemplary sockets shown in FIG. 15.

Hereinafter, a backlight assembly according to a fourth exemplary embodiment of the present invention will be described in detail with reference to FIGS. 14 through 16. FIG. 14 is a partial perspective view of an exemplary lamp-driving PCB 203 included in the exemplary backlight assembly according to the fourth exemplary embodiment of the present invention. FIG. 15 is a perspective view of one exemplary socket 303 included in the exemplary backlight assembly according to the fourth exemplary embodiment of the present invention. FIG. 16 is a partial perspective view of the exemplary backlight assembly according to the fourth exemplary embodiment in which the exemplary lamp-driving PCB 203 shown in FIG. 14 is coupled to the exemplary sockets 303 shown in FIG. 15.

Referring to FIGS. 14 through 16, the lamp-driving PCB 203 according to the present embodiment includes a plurality of pairs of conductive pads 233. One of the conductive pads 233 in each pair is formed at a position where a third plate 330 of a corresponding one of the sockets 303 is to be disposed. Accordingly, first wiring 253 extends to the position of one of the conductive pads 233 in each pair.

Each of the sockets 303 according to the present embodiment includes a pair of vertical fixing portions which are formed on sides of a first plate 312 and/or a second plate 320. Each of the vertical fixing portions may include a first fixing platform 372 which protrudes from a lower end of a corresponding one of socket guide portions 312b and a second fixing platform 383 which protrudes from an upper end of the corresponding one of the socket guide portions 312b. In an alternative exemplary embodiment, the second fixing platform 383 may protrude from a lower end of the third plate 330, such that the second fixing platform 383 is spaced from the first fixing platform 372 by a distance approximately equal to a thickness of the substrate 207 of the lamp-driving PCB 203. The second fixing platform 383 may include a curved portion 383a that protrudes from either an upper end of the socket guide portion 312b or the lower end of the third plate 330 and one or more flat portions 383b that protrude from an end of the curved portion 383a. With the first and second fixing platforms 372 and 383 contacting lower and upper surfaces of the substrate 207, the second fixing platform 383, such as the flat portions 383b, of the vertical fixing portion may contact each pair of the conductive pads 233 so that power distributed by each of capacitors 240 can be applied to a corresponding one of the sockets 303.

Figure 17:
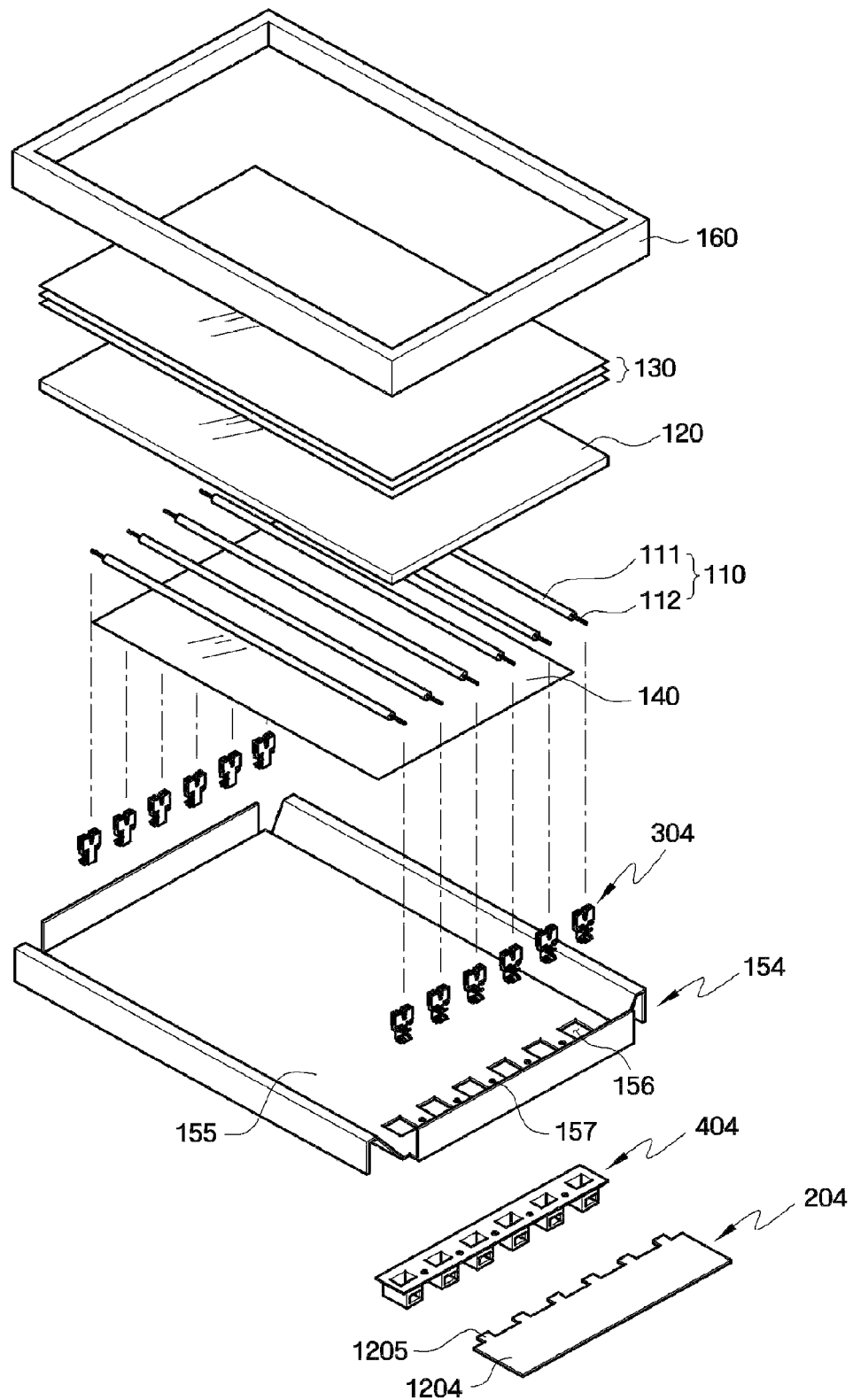
FIG. 17 is an exploded perspective view of an exemplary backlight assembly according to a fifth exemplary embodiment of the present invention.
Figure 18:
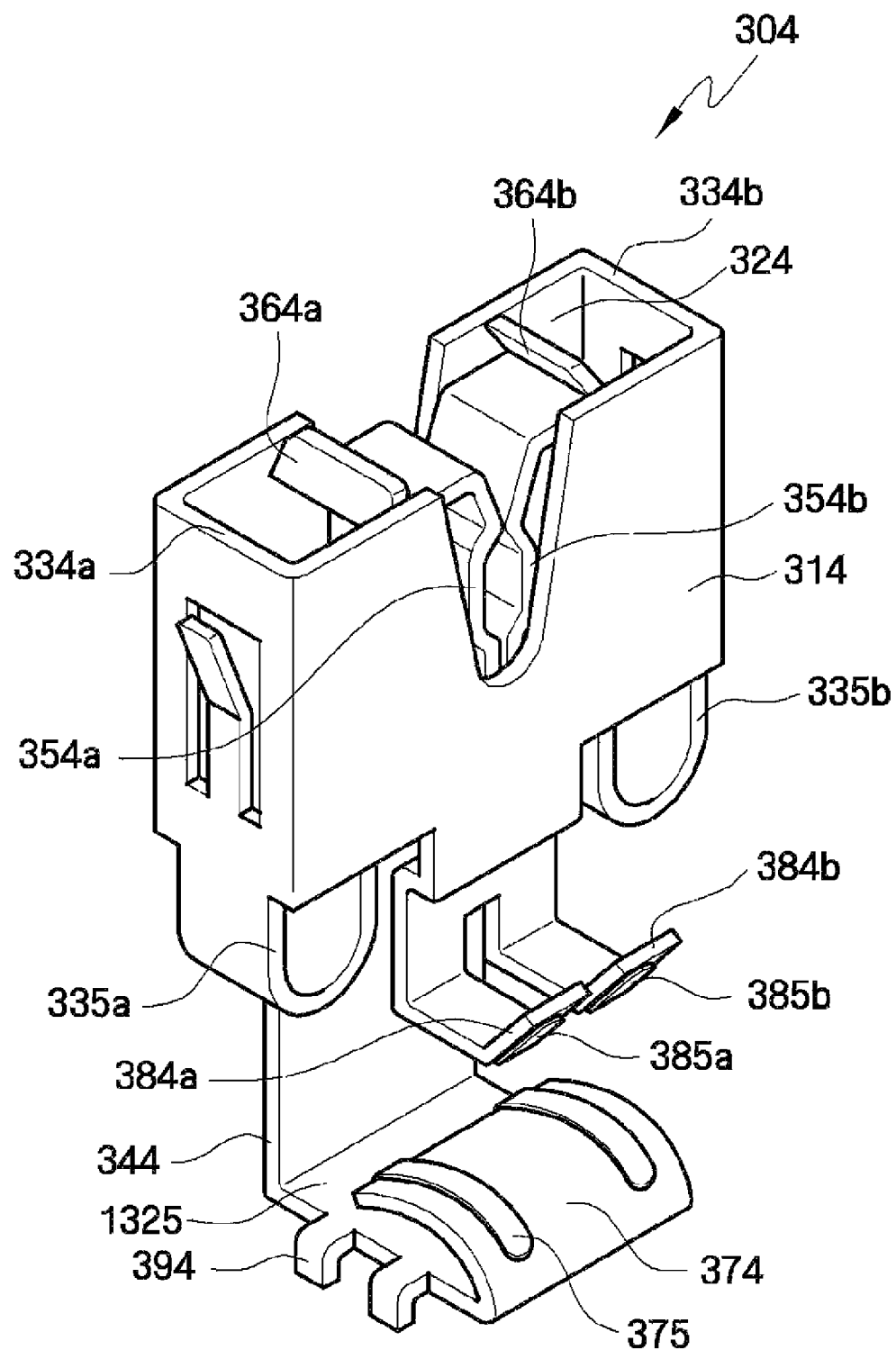
FIG. 18 is a perspective view of an exemplary socket included in the exemplary backlight assembly according to the fifth exemplary embodiment of the present invention.
Figure 19:
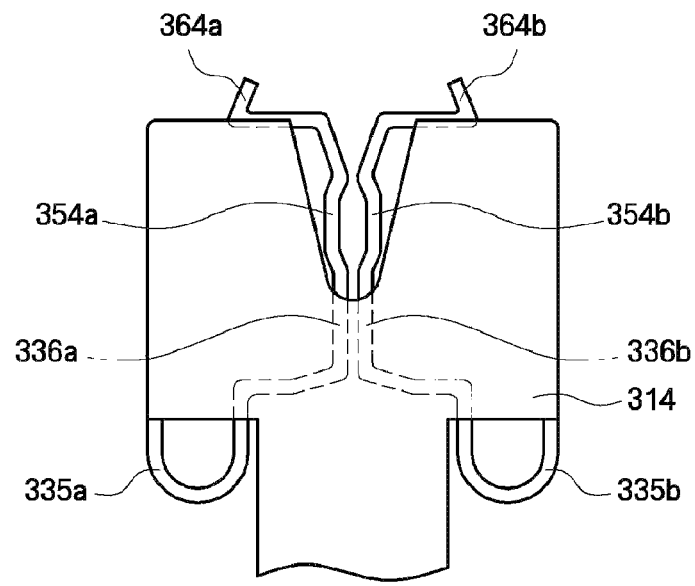
FIG. 19 is a see-through perspective view of the exemplary socket included in the exemplary backlight assembly according to the fifth exemplary embodiment of the present invention.
Figure 20:
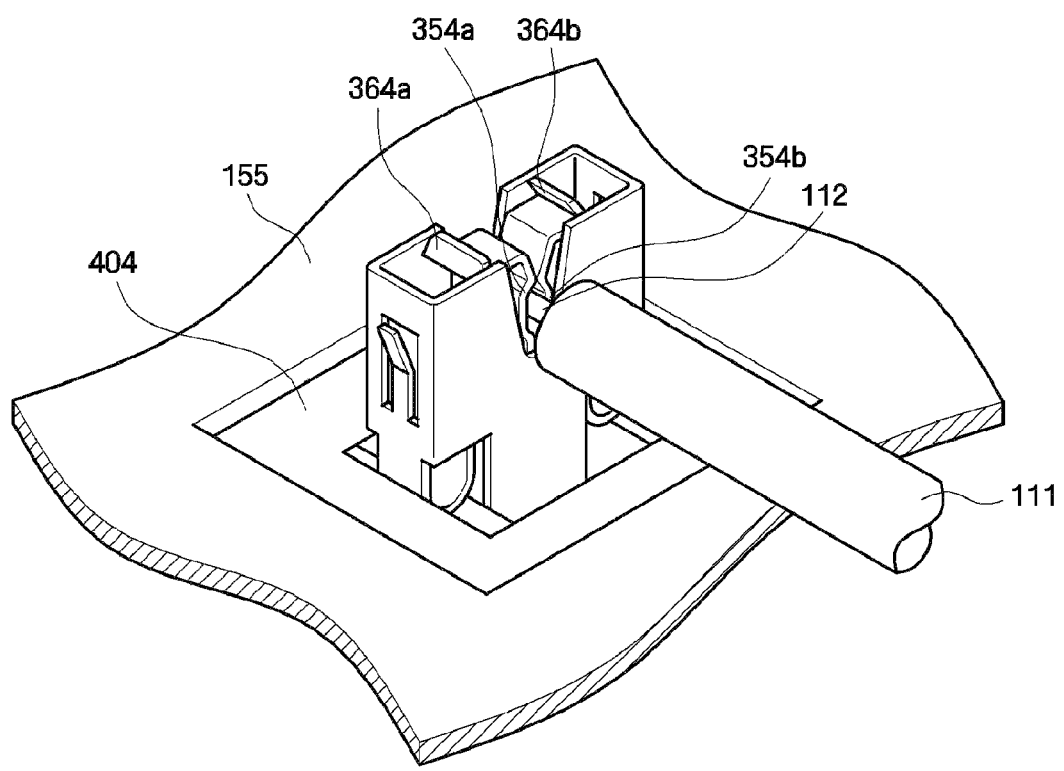
FIG. 20 is a schematic view of the exemplary socket of FIG. 18 which is coupled to a lower case, a socket alignment plate, and a lamp included in the exemplary backlight assembly according to the fifth exemplary embodiment of the present invention.
Figure 21:
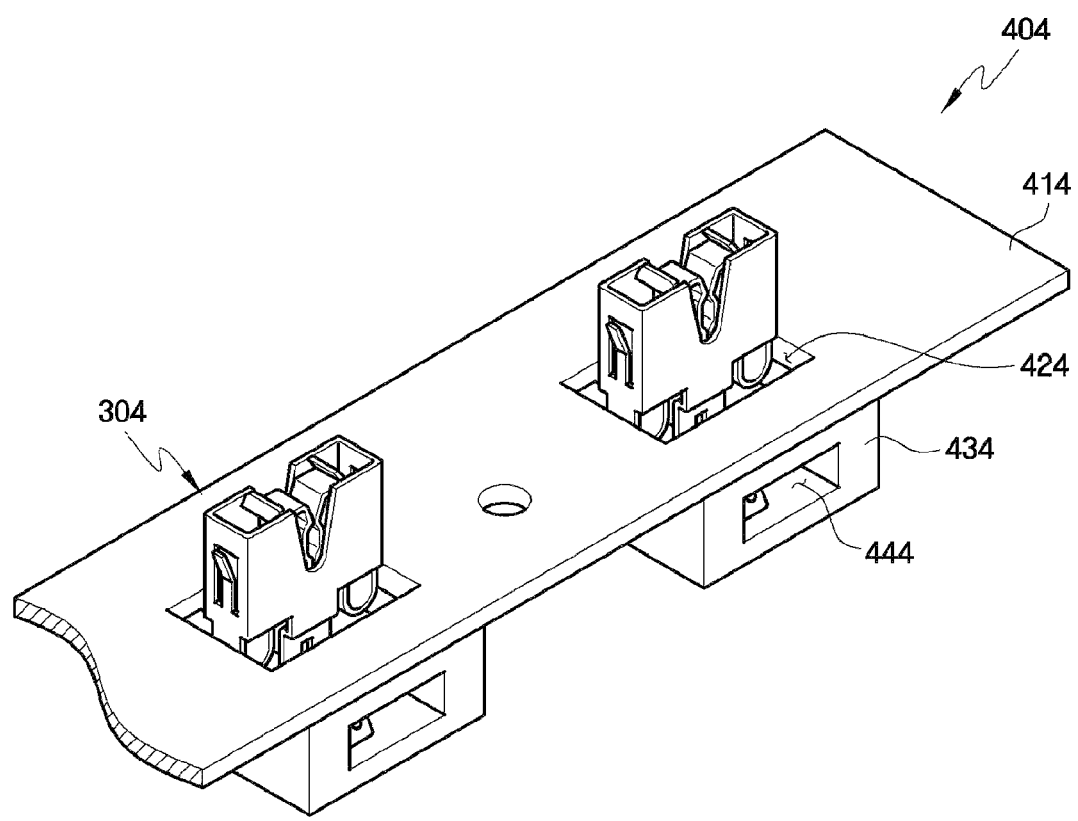
FIG. 21 is a perspective view of the exemplary sockets of FIG. 18 which are coupled to the socket alignment plate included in the exemplary backlight assembly according to the fifth exemplary embodiment of the present invention.
Figure 22:
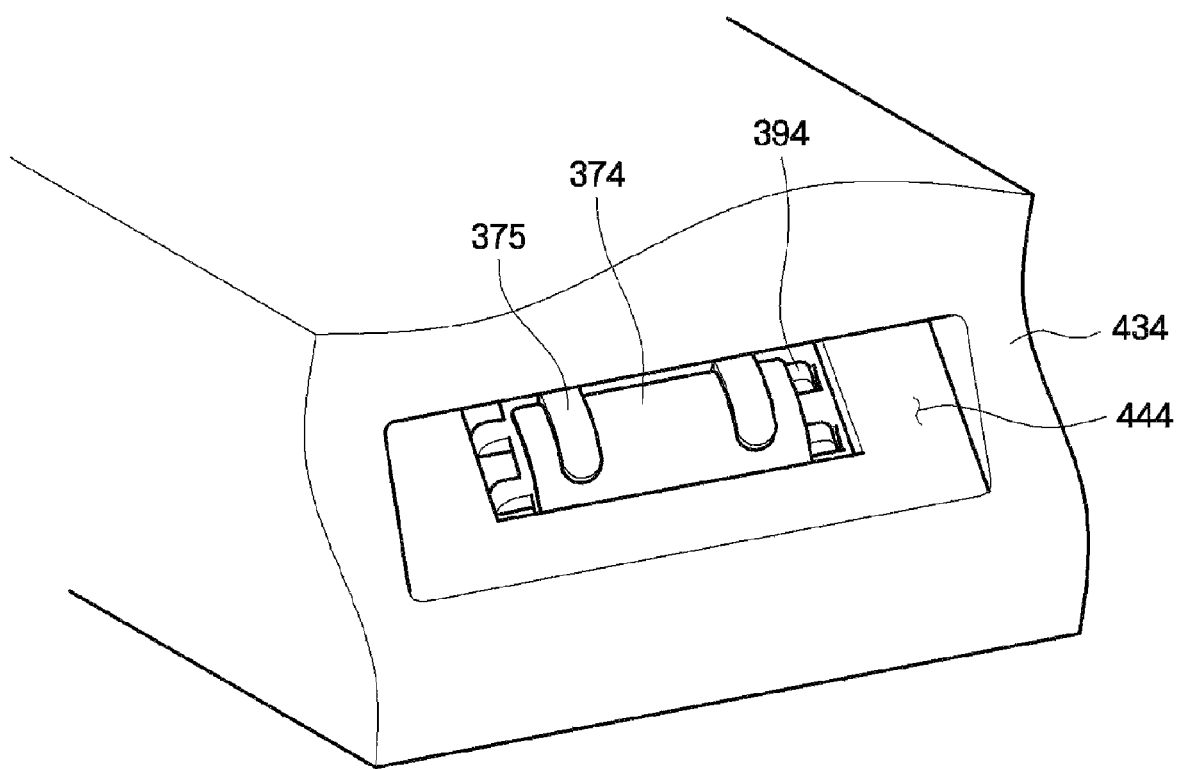
FIGS. 22 and 23 are partially enlarged perspective views of the exemplary socket alignment plate shown in FIG. 21.
Figure 23:
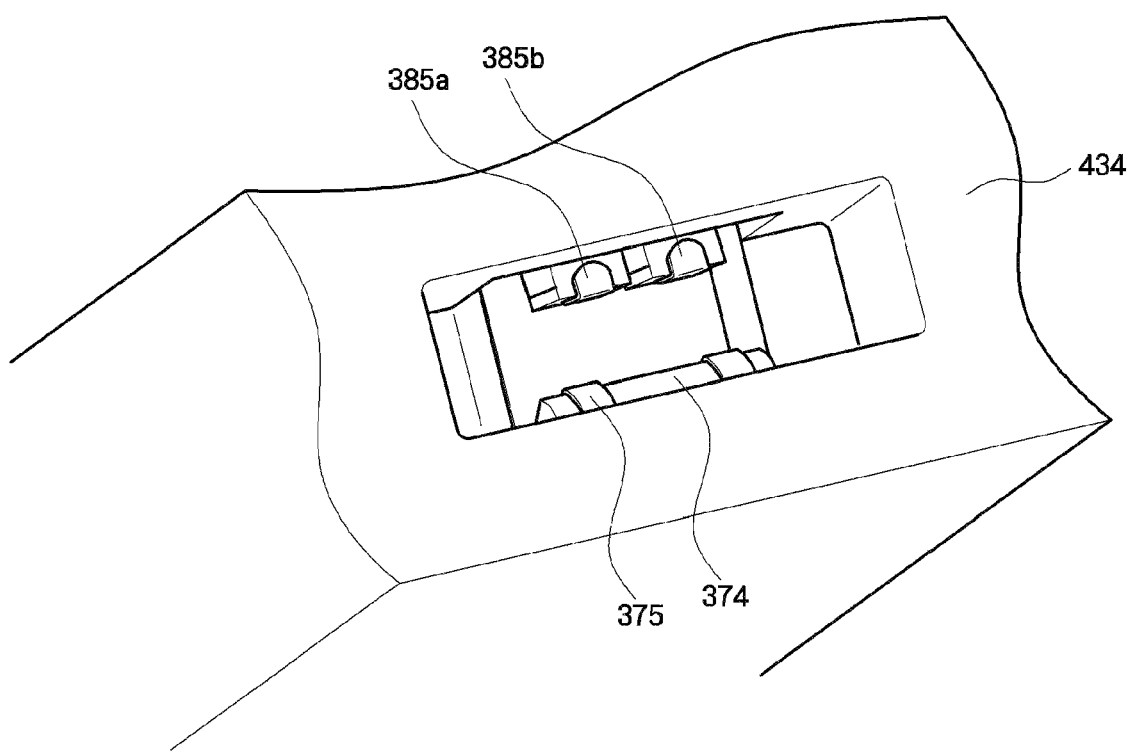
Figure 24:
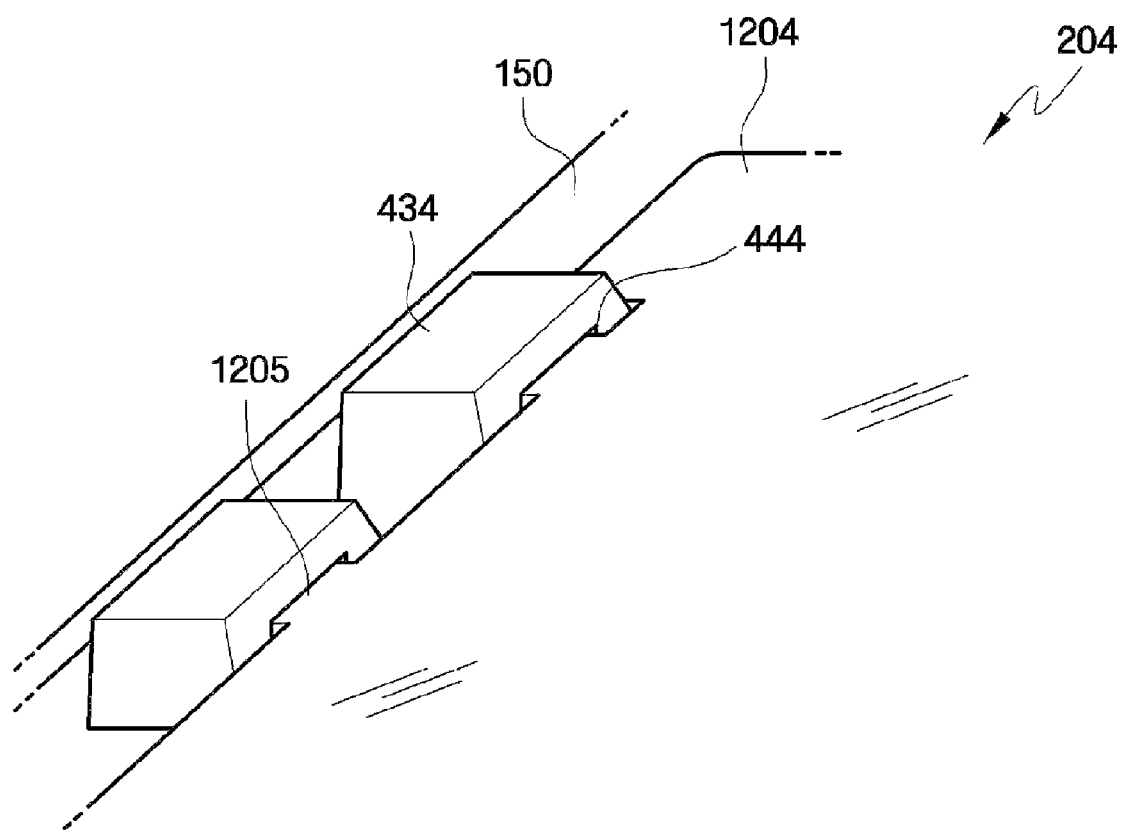
FIG. 24 is a bottom perspective view of the exemplary backlight assembly according to the fifth exemplary embodiment of the present invention.

Hereinafter, a backlight assembly according to a fifth exemplary embodiment of the present invention will be described in detail with reference to FIGS. 17 through 24. FIG. 17 is an exploded perspective view of the exemplary backlight assembly according to the fifth exemplary embodiment of the present invention. FIG. 18 is a perspective view of one exemplary socket 304 included in the exemplary backlight assembly according to the fifth exemplary embodiment of the present invention. FIG. 19 is a see-through perspective view of one of the exemplary sockets 304 included in the exemplary backlight assembly according to the fifth exemplary embodiment of the present invention. FIG. 20 is a schematic view of one of the exemplary sockets 304 of FIG. 18 which is coupled to a lower case 154, a socket alignment plate 404, and one of the lamps 110 included in the exemplary backlight assembly according to the fifth exemplary embodiment of the present invention. FIG. 21 is a perspective view of the exemplary sockets 304 of FIG. 18 which are coupled to the socket alignment plate 404 included in the exemplary backlight assembly according to the fifth exemplary embodiment of the present invention. FIGS. 22 and 23 are partially enlarged perspective views of the socket alignment plate 404 shown in FIG. 21. FIG. 24 is a bottom perspective view of the exemplary backlight assembly according to the fifth exemplary embodiment of the present invention.

Referring to FIG. 17, the backlight assembly according to the present embodiment further includes the socket alignment plate 404. Each of the sockets 304 includes a first leaf spring and a second leaf spring.

The socket alignment plate 404 may be fixed to a rear side, lower surface, of a bottom plate 155 of the lower case 154. However, the present invention is not limited thereto. The socket alignment plate 404 may also be fixed to a front side, upper surface, of the bottom plate 155 of the lower case 154. The socket alignment plate 404 may be fixed to the lower case 154 by fixing members (not shown), such as screws. The fixing members may be respectively coupled to fixing member insertion grooves 157 which are formed in the bottom plate 155 of the lower case 154.

A plurality of apertures 156 may be formed in the bottom plate 155 of the lower case 154, and the sockets 304 may be inserted into the apertures 156, respectively.

A lamp-driving PCB 204 is also disposed on the rear side or lower surface of the bottom plate 155 of the lower case 154. The lamp-driving PCB 204 includes a main body 1204 and a plurality of socket contact portions 1205 that may protrude outwardly from a side edge of the main body 1204. Circuit devices, which provide driving voltages to the lamps 110, are mounted on the main body 1204, and the socket contact portions 1205 protrude from the main body 1204 and directly contact the sockets 304, respectively.

Referring to FIGS. 17 through 19, each of the sockets 304 may have a conductive body. The conductive body may be made of a conductive material such as metal. Since the conductive body is connected to each of the socket contact portions 1205 and each of lamp electrodes 112, it delivers a driving voltage to each of the lamps 110.

The conductive body includes a first plate 314 which has a first guide groove and which is disposed perpendicular to a surface of the lamp-driving PCB 204. The conductive body further includes a second plate 324 and a pair of third plate 334a and 334b. The second plate 324 has a second guide groove which overlaps the first guide groove. The first and second guide grooves may include an opening portion that opens at an upper end of the first and second plates 314, 324, and a tapered portion that has a reduced width and extends partially towards the lower end of the first and second plates 314, 324. In addition, the second plate 324 is separated from the first plate 314 to face the first plate 314. The third plates 334a and 334b connect the first plate 314 to the second plate 324. The first guide groove and the second guide groove provide a space in which each of the lamp electrodes 112 can be fixed to a first leaf spring and a second leaf spring.

The first leaf spring and the second leaf spring include first and second guide grooves 354a and 354b, which are formed between the first and second guide grooves of the first and second plates 314, 324, and leaf spring grip portions 364a and 364b, respectively. In addition, the first and second leaf springs face each other in the space by which the first plate 314 is separated from the second plate 324. The first and second leaf springs grip each of the lamp electrodes 112 from both sides and thus fix each of the lamps 110 to a corresponding one of the sockets 304. Thus, the first and second leaf springs are electrically connected to each of the lamps 110.

As described above, the first and second leaf springs include the first and the second guide grooves 354a and 354b, respectively. The first and the second guide grooves 354a and 354b are disposed on both sides of each of the lamp electrodes 112. In addition, the first and the second guide grooves 354a and 354b surface-contact each of the lamp electrodes 112 and thus fix it to a corresponding one of the sockets 304.

The first and second leaf springs may further include the leaf spring grip portions 364a and 364b in upper parts thereof, respectively, which are adjacent an upper end of the socket 304. The function of the leaf spring grip portions 364a and 364b will be described in detail later.

The first and second leaf springs may extend from the third plates 334a and 334b, respectively. That is, each of the third plates 334a and 334b extends downward from an upper end of the socket 304 and then is bent in a direction opposite the direction in which it extends. The first and second leaf springs may further include leaf spring contact portions 336a and 336b (FIG. 19) which respectively extend in opposite directions from the third plates 334a and 334b toward the center of each of the sockets 304 and then be bent to contact each other in the space by which the first plate 314 is separated from the second plate 324.

A vertical fixing portion includes a third leaf spring 374 and a pair of first fixing platforms 384a and 384b. The vertical fixing portion may extend from any one of the first and second leaf springs. In an alternative exemplary embodiment, the third leaf spring may extend from a lower end of the second plate 324, as will be further described below, and the first fixing platforms 384a, 384b may extend from a lower end of the first plate 314. The first fixing platforms 384a and 384b contact an upper surface of each of the socket contact portions 1205. The first fixing platforms 384a and 384b are separated from each other and provided as a pair as shown in the drawings. However, the present invention is not limited thereto. That is, the first fixing platforms 384a and 384b may also be integrated with each other.

First fixing platform protrusions 385a and 385b may be formed on the first fixing platforms 384a and 384b, respectively, in order to more securely attach the first fixing platforms 384a and 384b to each of the socket contact portions 1205. In this case, the first fixing platforms 384a and 384b and the first fixing platform protrusions 385a and 385b may all be made of conductive materials to receive power from each of the socket contact portions 1205.

The third leaf spring 374 contacts a lower surface of each of the socket contact portions 1205. A height-adjusting portion 344 may extend downward from the second plate 324, and a support portion 1325 extends from the height-adjusting portion 344 to be parallel to a surface of the lamp-driving PCB 204. The height-adjusting portion 344 makes each of the sockets 304 protrude upward to a predetermined height from the bottom plate 155 of the lower case 154.

The third leaf spring 374 extends from an end of the support portion 1325 and is convex and formed over a top surface of the support portion 1325 to overlap the support portion 1325. That is, a lower surface of the third leaf spring 374 faces the top surface of the support portion 1325, and an upper surface of the third leaf spring 374 is arranged to face a lower surface of the socket contact portion 1205. The third leaf spring 374 contacts the lower surface of each of the socket contact portions 1205 and thus securely fixes each of the socket contact portions 1205 to a corresponding one of the sockets 304. A pair (or more) of third leaf spring protrusions 375 may further be formed on a top surface of the third leaf spring 374 in order to more securely attach the third leaf spring 374 to each of the socket contact portions 1205.

A plurality of first fixing protrusions 394 protrude downward from the support portion 1325 and are tightly fitted to the socket alignment plate 404, such as through apertures or grooves formed in the socket alignment plate 404, thereby securely fixing each of the sockets 304 to the socket alignment plate 404.

Referring to FIG. 20, the first and second leaf springs may include the leaf spring grip portions 364a and 364b, respectively. A worker can easily insert each of the lamp electrodes 112 between the third guide grooves 354a and 354b by controlling the distance between the third guide grooves 354a and 354b by pulling the leaf spring grip portions 364a and 364b in opposite directions.

Referring to FIGS. 21 through 24, the socket alignment plate 404 includes a support plate 414 and a plurality of external power-applying units 434 which protrude downward from the support plate 414.

A plurality of first socket alignment plate insertion grooves 424 are formed in the support plate 414, and a plurality of second socket alignment plate insertion grooves 444 are formed in the external power-applying units 434, respectively. The sockets 304 are inserted within and thus fixed to the first socket alignment plate insertion grooves 424, respectively, and the socket contact portions 1205 of the lamp-driving PCB 204 are inserted into the second socket alignment plate insertion grooves 444, respectively.

Referring to FIG. 22, the third leaf spring 374 and the third leaf spring protrusions 375 are disposed adjacent a bottom plate of each of the external power-applying units 434. In addition, the first fixing protrusions 394 are tightly and respectively fitted into a plurality of first fixing protrusion insertion grooves (not shown) of the bottom plate of each of the external power-applying units 434.

Referring to FIG. 23, the third leaf spring 374 of the vertical fixing portion is separated from the first fixing platforms 384a and 384b of the vertical fixing portion, such as by an approximate thickness or less of the lamp-driving PCB 204, and each of the socket contact portions 1205 of the lamp-driving PCB 204 shown in FIG. 24 is inserted between the third leaf spring 374 and the first fixing platforms 384a and 384b. Accordingly, a lamp-driving voltage of the lamp-driving PCB 204 is delivered to the vertical fixing portion via each of the socket contact portions 1205. Since the sockets 304 are made of a conductive material, the lamp-driving voltage delivered to the vertical fixing portion is also delivered to each of the lamp electrodes 112 via the first and second leaf springs, thereby lighting a corresponding one of the lamps 110.

In the backlight assembly according to the present embodiment, each of the lamp electrodes 112 is fixed to a corresponding one of the sockets 304 by the first and second leaf springs. Therefore, concerns over foreign matter, which may be created due to the friction of the lamp electrodes 112 against the sockets 304, can be reduced, and each of the lamp electrodes 112 can be more securely fixed to a corresponding one of the sockets 304. In addition, since the vertical fixing portion includes the third leaf spring 374, the lamp-driving PCB 204 can be more securely coupled to the sockets 304.

Hereinafter, an exemplary method of assembling a backlight assembly according to a sixth exemplary embodiment of the present invention will be described in detail with reference to FIGS. 1, 25 and 26.

Figure 25:
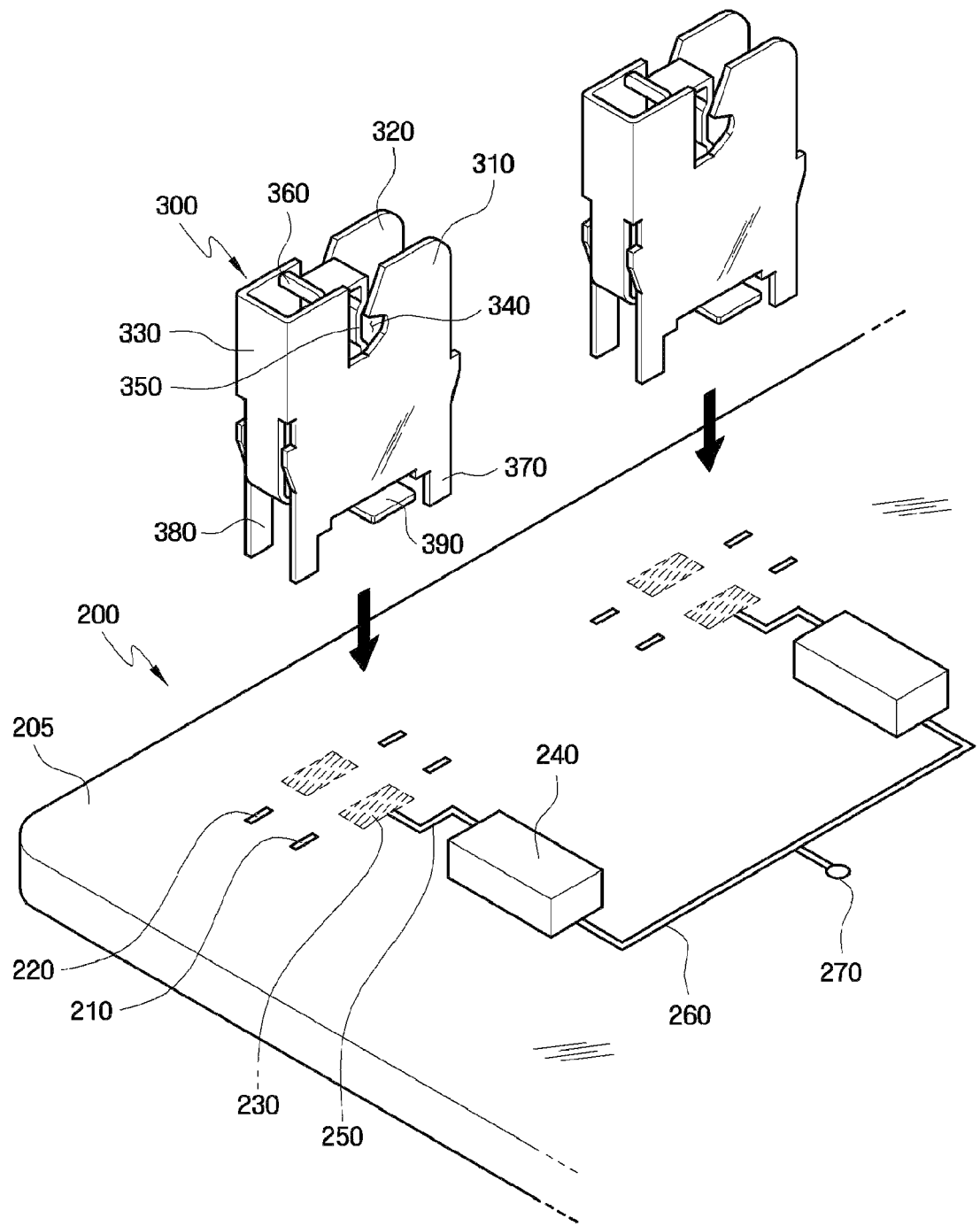
FIGS. 25 and 26 are schematic views for describing sequential processes included in an exemplary method of assembling an exemplary backlight assembly according to a sixth exemplary embodiment of the present invention.

Referring to FIGS. 1 and 25, a pair of lamp-driving PCBs 200 is provided. Each of the lamp-driving PCBs 200 includes a plurality of pairs of conductive pads 230 and a plurality of pairs of first socket-fixing grooves 210. The lamp-driving PCBs 200 may be substantially identical to those according to the first or second exemplary embodiment of the present invention.

To form the conductive pads 230, a conductive material may be deposited on a substrate 205 and then etched. The first socket-fixing grooves 210 may be formed by applying a physical force to the substrate 205 or etching the substrate 205. However, the method of forming the first socket-fixing grooves 210 is not limited to the above examples. Other circuit devices, such as capacitors 240, first wiring 250 and second wiring 260, may be disposed on the substrate 205 before or after the conductive pads 230 and the first socket-fixing grooves 210 are formed on the substrate 205.

A plurality of sockets 300 is mounted on each of the lamp-driving PCBs 200. As described above, each of the sockets 300 has a conductive body which includes first through third plates 310 through 330. In addition, the conductive body has a first guide groove 340 and a pair of first fixing protrusions 370. Each of the sockets 300 is fixed to a corresponding one of the lamp-driving PCBs 200 by surface-mounting the conductive body on each pair of the conductive pads 230. Specifically, a first fixing platform 390, which protrudes from the conductive body, is soldered to one of the conductive pads 230 in each pair. As a result, each of the sockets 300 is mounted on a corresponding one of the lamp-driving PCBs 200. Here, the pair of the first fixing protrusions 370 of each of the sockets 300 is inserted into each pair of the first socket-fixing grooves 210, thereby fixing each of the sockets 300 into a corresponding one of the lamp-driving PCBs 200. Additionally, a pair of the second fixing protrusions 380 may also be inserted into the second socket fixing grooves 220.

Figure 26:
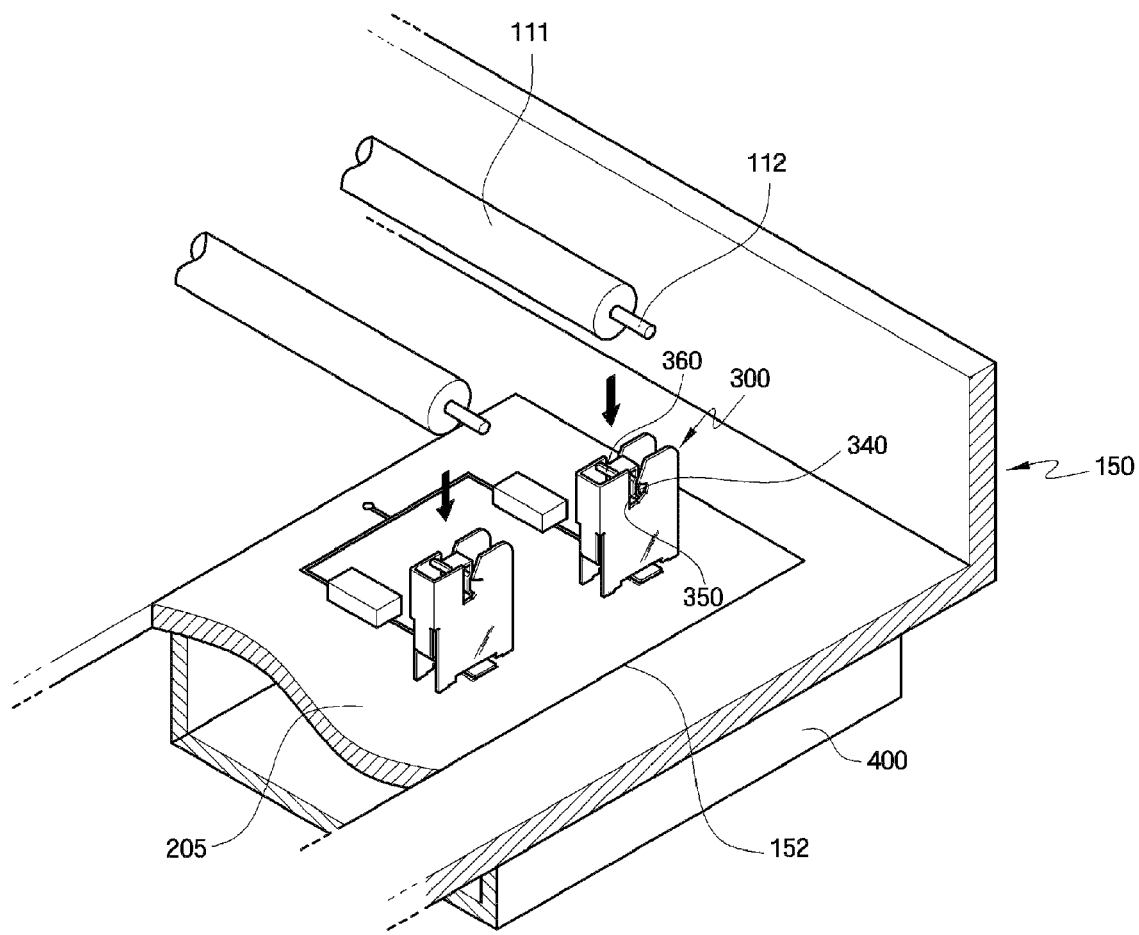

Referring to FIGS. 1 and 26, the lamp-driving PCBs 200 and the sockets 300 are accommodated in the lower case 150. In this case, the lamp-driving PCBs 200 may be respectively inserted into apertures 152 of the lower case 150 from under or above the lower case 150.

After the sockets 300 are inserted into the lamp-driving PCBs 200, lamps 110 may be fixed to the sockets 300. Alternatively, after the lamps 110 are inserted into the sockets 300, the sockets 300 may be inserted into the lamp-driving PCBs 200. When each of the lamps 110 is inserted into a corresponding one of the sockets 300, the distance between a side of the first guide groove 340 and a third guide groove 350 is increased by using a leaf spring grip portion 360, so that each of lamp electrodes 112 can be easily inserted between the sides of the first guide groove 340 and the third guide groove 350. Before the lamps 110 are inserted into the sockets 300, a reflective sheet 140 may be installed in the lower case 150.

Other parts, such as a diffusion plate 120 and optical sheets 130, may be installed in the lower case 150 before or after the substrate 205 and the sockets 300 are installed in the lower case 150.

Hereinafter, an exemplary method of assembling an exemplary backlight assembly according to a seventh another exemplary embodiment of the present invention will be described in detail with reference to FIGS. 9, 27 and 28.

Figure 27:
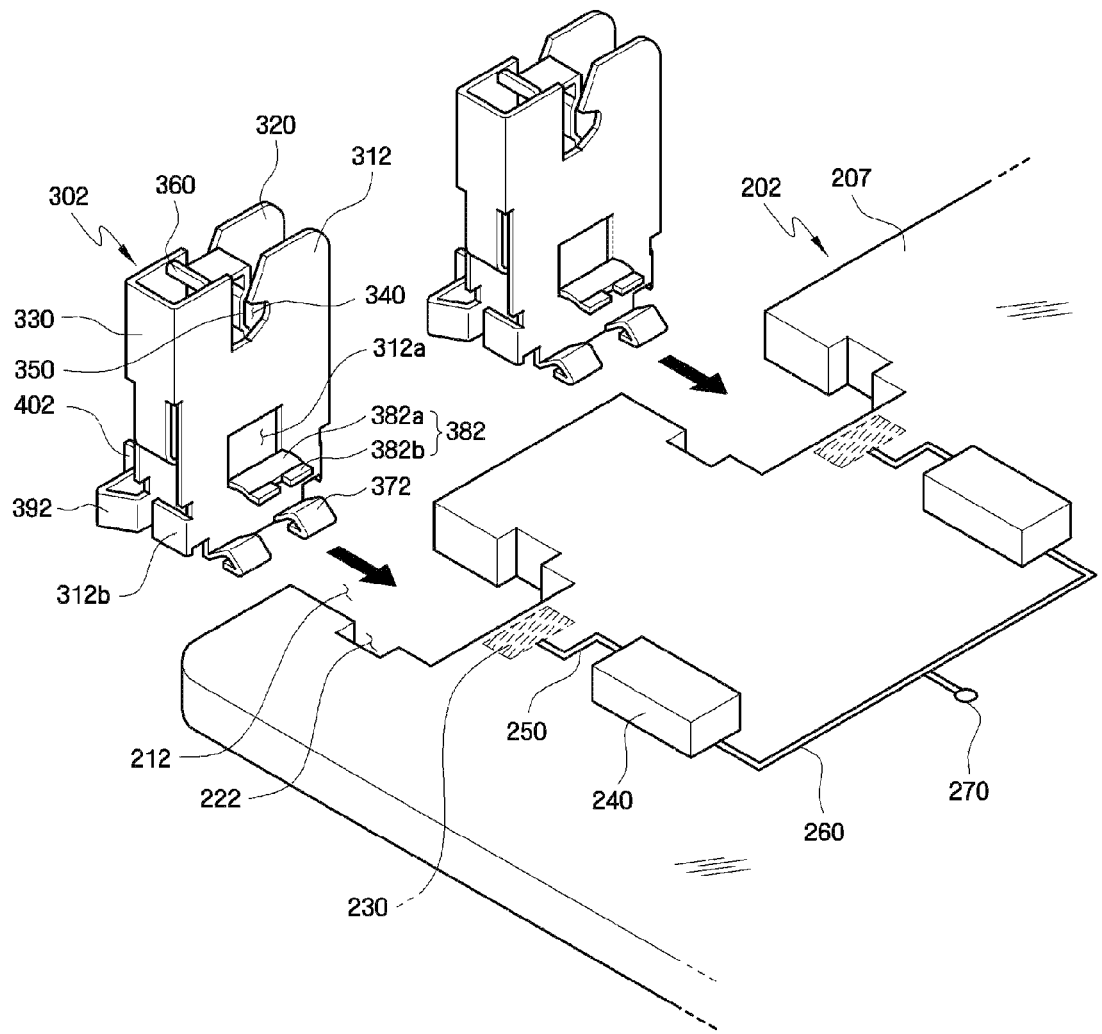
FIGS. 27 and 28 are schematic views for describing sequential processes included in an exemplary method of assembling an exemplary backlight assembly according to a seventh exemplary embodiment of the present invention.

Referring to FIGS. 9 and 27, a pair of lamp-driving PCBs 202 is provided. Each of the lamp-driving PCBs 202 includes a plurality of socket insertion grooves 212 indented from a side thereof and a plurality of conductive pads 230. The socket insertion grooves 212 may be formed by cutting an end of a substrate 207. Sockets 302 and the lamp-driving PCBs 202 according to the present embodiment may be identical to those according to the third or fourth exemplary embodiment of the present invention.

Each of the sockets 302 is fixed to a corresponding one of the lamp-driving PCBs 202. Each of the sockets 302 has a conductive body which includes first through third plates 312, 320 and 330. The conductive body also includes a first guide groove 340, a vertical fixing portion, and a horizontal fixing portion 392. The vertical fixing portion grips a corresponding one of the lamp-driving PCBs 202 in a vertical direction, and the horizontal fixing portion 392 is coupled to each of the socket insertion grooves 212 in a horizontal direction.

Specifically, the vertical fixing portion includes a pair of first fixing platforms 372 and a second fixing platform 382. The first fixing platforms 372 contact a lower surface of each of the lamp-driving PCBs 202, and the second fixing platform 382 contacts each of the conductive pads 230. As a result, each of the sockets 302 is fixed to a corresponding one of the lamp-driving PCBs 202.

Each of the socket insertion grooves 212 may include a socket stop groove 222 expanded from the socket insertion grooves 212, with indentations into the substrate 207 on opposing sides of the socket insertion grooves 212, and a width of the socket stop groove 222 may be greater than a width of each of the socket insertion grooves 212. The horizontal fixing portion 392 is closely attached to the socket stop groove 222, thereby fixing each of the sockets 302 to a corresponding one of the socket insertion grooves 212.

Each of the sockets 302 further includes a pair of socket grip portions 402 which protrude from the horizontal fixing portion 392 and are used to control the width of the horizontal fixing portion 392. Therefore, if one of the sockets 302 is defective and thus needs to be repaired, the width of the horizontal fixing portion 392 is reduced to be smaller than the width of the socket stop groove 222 by pressing the socket grip portions 402 against each other. Thus, the defective socket 302 can be easily removed from a corresponding one of the socket insertion grooves 212. After the defective socket 302 is repaired or replaced, it is inserted again into the corresponding one of the socket insertion grooves 212 and thus fixed to a corresponding one of the lamp-driving PCBs 202.

Figure 28:
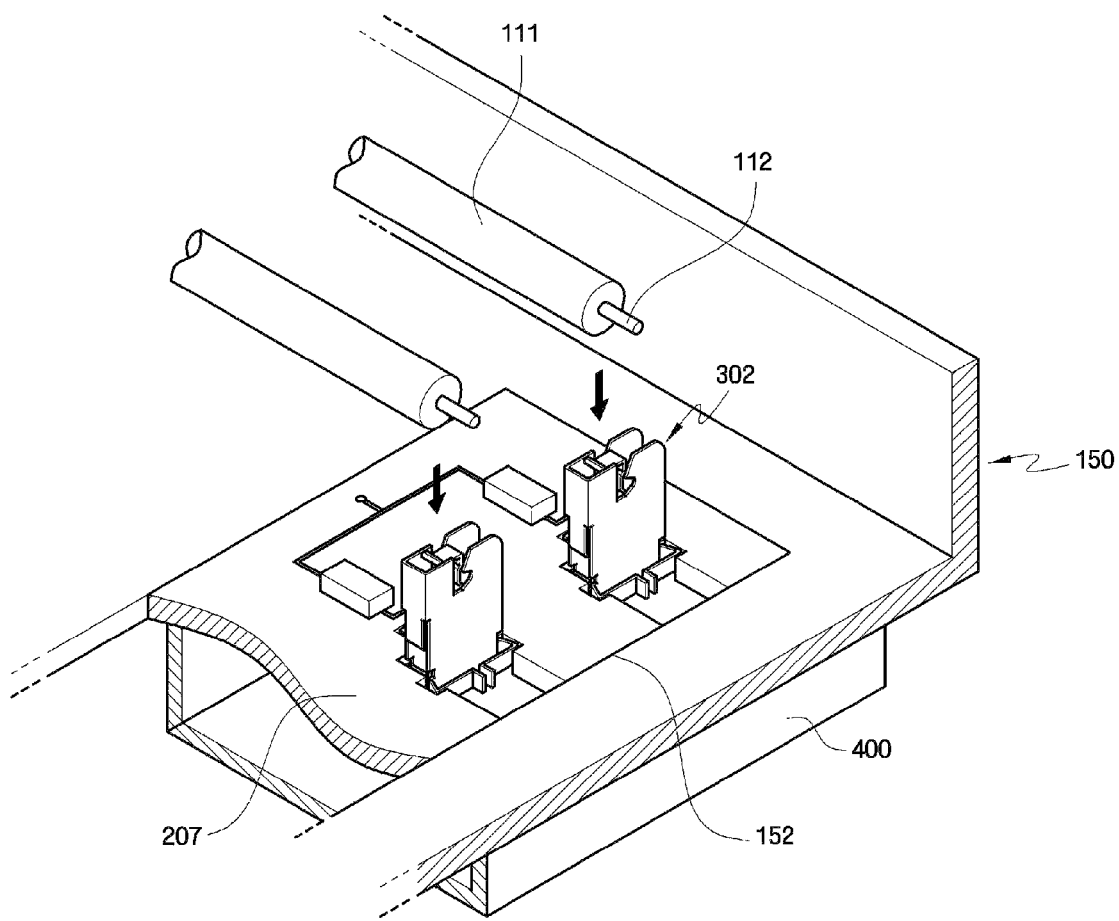

Referring to FIGS. 9 and 28, the lamp-driving PCBs 202 and the sockets 302 are installed in a lower case 150. After the sockets 300 are inserted into the lamp-driving PCBs 202, lamps 110 may be fixed to the sockets 300. Alternatively, after the lamps 110 are inserted into the sockets 300, the sockets 300 may be inserted into the lamp-driving PCBs 202. Other parts may be installed in the lower case 150 before or after the lamp-driving PCBs 202 and the sockets 300 are installed in the lower case 150. The processes of installing the lamp-driving PCBs 202, the sockets 302, and other parts in the lower case 150 are identical to those included in the assembling method according to the previous embodiment.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
   lamps, each lamp comprising a lamp tube and a pair of lamp electrodes disposed at ends of the lamp tube, respectively;
   a lamp-driving printed circuit board which comprises a plurality of conductive pads and a plurality of pairs of first socket-fixing grooves and provides a driving voltage to each of the lamps;
   sockets, each socket comprising a conductive body which includes a first guide groove, into which each of the lamp electrodes is inserted, respectively, and a pair of first fixing protrusions which is inserted into a corresponding pair of the first socket-fixing grooves; and a lower case which accommodates the lamp-driving printed circuit board, the sockets, and the lamps, wherein each of the sockets is surface-mounted on a corresponding conductive pad among the conductive pads on the lamp-driving printed circuit board.

2. The assembly of claim 1, wherein each of the sockets further comprises a first fixing platform which protrudes from the conductive body, wherein the first fixing platform is soldered to a corresponding one of the conductive pads.

3. The assembly of claim 1, wherein the conductive body comprises a first plate which includes the first guide groove and which is disposed perpendicular to a surface of the lamp-driving printed circuit board.

4. The assembly of claim 3, wherein the conductive body further comprises:

a second plate which includes a second guide groove overlapping the first guide groove and is separated from the first plate to face the first plate; and a leaf spring which includes a third guide groove disposed at a position corresponding to a position of the first guide groove and is installed between the first and second plates.

5. The assembly of claim 4, wherein the leaf spring further comprises a leaf spring grip portion which is used to control a distance between the first guide groove and the third guide groove.

6. The assembly of claim 4, wherein each of the first and second guide grooves comprises an open portion into which each of the lamp electrodes is introduced and an inner portion to which each of the lamp electrodes is fixed, and the third guide groove surface-contacts each of the lamp electrodes and securely attaches each of the lamp electrodes to the inner portion, wherein a width of each of the first and second guide grooves is gradually reduced from the opening portion toward the inner portion.

7. The assembly of claim 1, further comprising a plurality of capacitors disposed on the lamp-driving printed circuit board and contacting the sockets, respectively, wherein the driving voltage is distributed to each of the sockets via a corresponding one of the capacitors.

8. A method of assembling a backlight assembly, the method comprising:

providing a lamp-driving printed circuit board which comprises a plurality of conductive pads and a plurality of pairs of first socket-fixing grooves;

fixing a plurality of sockets, which each comprise a conductive body having a first guide groove and a pair of first fixing protrusions, to the lamp-driving printed circuit board such that the pair of the first fixing protrusions is inserted into each pair of the first socket-fixing grooves, respectively; and installing the lamp-driving printed circuit board and the sockets in a lower case, wherein fixing the plurality of sockets to the lamp-driving printed circuit board comprises surface-mounting the conductive body of each socket on a corresponding conductive pad.

9. The method of claim 8, wherein each socket further comprises a first fixing platform which protrudes from the conductive body, and surface-mounting the conductive body on the corresponding conductive pad comprises soldering the first fixing platform to the corresponding conductive pad.

* * * * *